(12) United States Patent
Saji et al.

(10) Patent No.: US 9,985,681 B2
(45) Date of Patent: May 29, 2018

(54) FRONT END CIRCUIT, MODULE, AND COMMUNICATION DEVICE

(71) Applicant: TAIYO YUDEN CO., LTD., Tokyo (JP)

(72) Inventors: Tetsuo Saji, Tokyo (JP); Yuki Endo, Tokyo (JP); Nobuaki Matsuo, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days. days.

(21) Appl. No.: 15/610,296

(22) Filed: May 31, 2017

(65) Prior Publication Data

US 2017/0272115 A1 Sep. 21, 2017

Related U.S. Application Data

(62) Division of application No. 14/994,847, filed on Jan. 13, 2016, now Pat. No. 9,705,557.

(30) Foreign Application Priority Data

Apr. 27, 2015 (JP) ................................. 2015-090663
Aug. 7, 2015 (JP) ................................. 2015-157557

(51) Int. Cl.
*H04B 1/44* (2006.01)
*H04B 1/40* (2015.01)
(Continued)

(52) U.S. Cl.
CPC ............ *H04B 1/44* (2013.01); *H04B 1/0057* (2013.01); *H04B 1/0064* (2013.01); *H04B 15/02* (2013.01)

(58) Field of Classification Search
CPC ..................................................... H04B 1/44
(Continued)

(56) References Cited

U.S. PATENT DOCUMENTS 8,320,842 B2 * 11/2012 Rousu ................. H04B 1/0057
455/78
9,077,439 B2 * 7/2015 Uejima ............... H04B 1/0057
(Continued)

FOREIGN PATENT DOCUMENTS

CN 102801401 A 11/2012
CN 103166668 A 6/2013
(Continued)

OTHER PUBLICATIONS

Korean Office Action dated Feb. 7, 2017, in a counterpart Korean patent application No. 10-2016-0049169. (Cited in the parent U.S. Appl. No. 14/994,847.).

(Continued)

*Primary Examiner* — Tilahun B Gesesse
(74) *Attorney, Agent, or Firm* — Chen Yoshimura LLP

(57) ABSTRACT

A module comprising: a first transmit filter that passes a transmission signal of a first band; a first receive filter that passes a reception signal of the first band; a second transmit filter that passes a transmission signal of a second band; a second receive filter that passes a reception signal of the second band; a third transmit filter that passes a transmission signal of a third band; and a third receive filter that passes a reception signal of the third band, wherein a transmit band of the first band overlaps with at least a part of a receive band of the second band, a receive band of the third band does not overlap with the transmit band of the first band or a transmit band of the second band, and the third receive filter is located between the first receive filter and the second receive filter.

15 Claims, 34 Drawing Sheets

(51) Int. Cl.
*H04B 1/00* (2006.01)
*H04B 15/02* (2006.01)

(58) Field of Classification Search
USPC .......................................... 455/78, 403, 500
See application file for complete search history.

(56) References Cited

U.S. PATENT DOCUMENTS

| | | | |
|---|---|---|---|
| 9,209,775 B2* | 12/2015 | Ebihara | H03H 7/465 |
| 2006/0121857 A1* | 6/2006 | Han | H04B 1/525 |
| | | | 455/73 |
| 2006/0128393 A1* | 6/2006 | Rooyen | H04B 1/005 |
| | | | 455/452.2 |
| 2007/0273595 A1 | 11/2007 | Shimasaki et al. | |
| 2012/0300679 A1 | 11/2012 | Tsutsumi | |
| 2013/0051284 A1* | 2/2013 | Khlat | H04L 5/00 |
| | | | 370/277 |
| 2013/0088404 A1 | 4/2013 | Ramachandran et al. | |
| 2013/0157717 A1 | 6/2013 | Yu et al. | |
| 2013/0272176 A1* | 10/2013 | Uejima | H04B 1/006 |
| | | | 370/282 |
| 2014/0003300 A1 | 1/2014 | Weissman et al. | |
| 2014/0044022 A1 | 2/2014 | Matsuo et al. | |
| 2014/0203887 A1* | 7/2014 | Murata | H03H 7/38 |
| | | | 333/103 |
| 2014/0329475 A1 | 11/2014 | Ella et al. | |
| 2014/0341090 A1 | 11/2014 | Kawachi et al. | |

FOREIGN PATENT DOCUMENTS

| | | |
|---|---|---|
| CN | 104115411 A | 10/2014 |
| JP | 2003-032140 A | 1/2003 |
| JP | 2007-318678 A | 12/2007 |
| JP | 2013-168701 A | 8/2013 |
| JP | 2014-140115 A | 7/2014 |
| JP | 5561379 B2 | 7/2014 |
| JP | 2014-526847 A | 10/2014 |
| KR | 10-2013-0112426 A | 10/2013 |
| WO | 2012/093539 A1 | 7/2012 |
| WO | 2014/005061 A1 | 1/2014 |

OTHER PUBLICATIONS

Chinese Office Action dated Dec. 5, 2017, in a counterpart Chinese patent application No. 201610261961.7.

Japanese Office Action dated Jan. 9, 2018, in a counterpart Japanese patent application No. 2015-157557. (A machine translation (not reviewed for accuracy) attached.).

* cited by examiner

FIG. 1

LOW BAND

| BAND | TRANSMIT BAND (MHz) | RECEIVE BAND (MHz) |
|---|---|---|
| 5 | 824-849 | 869-894 |
| 8 | 880-915 | 925-960 |
| 12 | 699-716 | 729-746 |
| 13 | 777-787 | 746-756 |
| 17 | 704-716 | 734-746 |
| 20 | 832-862 | 791-821 |
| 26 | 814-849 | 859-894 |
| 29 | — | 717-728 |

MIDDLE BAND

| BAND | TRANSMIT BAND (MHz) | RECEIVE BAND (MHz) |
|---|---|---|
| 1 | 1920-1980 | 2110-2170 |
| 2 | 1850-1910 | 1930-1990 |
| 3 | 1710-1785 | 1805-1880 |
| 4 | 1710-1755 | 2100-2155 |
| 25 | 1850-1915 | 1930-1995 |

HIGH BAND

| BAND | TRANSMIT BAND (MHz) | RECEIVE BAND (MHz) |
|---|---|---|
| 7 | 2500-2570 | 2620-2690 |
| 30 | 2305-2315 | 2350-2360 |

FRONT END CIRCUIT, MODULE, AND COMMUNICATION DEVICE

CROSS-REFERENCE TO RELATED APPLICATION

This application is a divisional of a pending application, application Ser. No. 14/994,847 filed on Jan. 13, 2016, which is hereby incorporated by reference in its entirety. The parent application is based upon and claims the benefit of priority of the prior Japanese Patent Application No. 2015-090663, filed on Apr. 27, 2015, and the prior Japanese Patent Application No. 2015-157557, filed on Aug. 7, 2015, the entire contents of which are incorporated herein by reference.

FIELD

A certain aspect of the present invention relates to a front end circuit, a module, and a communication device.

BACKGROUND

Signals of multiple bands may be transmitted and received in wireless communication devices such as mobile phone terminals. For example, LTE (Long Term Evolution) or the like uses bands including a low band of 1 GHz or lower, a middle band around 2 GHz, and a high band around 2.5 GHz. Each of the low band, the middle band, and the high band includes two or more bands each including a transmit band and a receive band.

Sharing an antenna terminal between the low band and the middle band with use of a diplexer is disclosed in Japanese Patent Application Publication No. 2014-526847 (Patent Document 1), U.S. Patent Application Publication No. 2006/0128393 (Patent Document 2), and International Publication No. 2012/093539 (Patent Document 3). Patent Document 2 discloses an art that uses individual antenna terminals for the low band, the middle band, and the high band. Patent Document 3 discloses an arrangement of filters for two or more bands.

When separate antenna terminals are provided as described in Patent Documents 1, 2, the interference between the bands is reduced (for example, the isolation is improved), but three connectors for RF (Radio Frequency) are required, and thus the cost and the size increase. On the other hand, when the antenna terminal is shared, the cost and the size can be reduced, but the interference between the bands increases. For example, when three antenna terminals are unified to be a shared single antenna, the number of required RF connectors becomes one, but the loss of a multiplexer and/or the interference between the bands increases. Moreover, the methods disclosed in Patent Documents 1 through 3 fail to sufficiently reduce the interference between the bands.

SUMMARY OF THE INVENTION

According to an aspect of the present invention, there is provided a front end circuit including: a first antenna terminal that is coupled to a first antenna, from which transmission signals of a low band and a high band are output, and to which reception signals of the low band and the high band are input, frequency of the high band being higher than frequency of the low band; a second antenna terminal that is coupled to a second antenna different from the first antenna, from which a transmission signal of a middle band is output, and to which a reception signal of the middle band is input, frequency of the middle band being higher than the frequency of the low band and being lower than the frequency of the high band; a low band terminal to which the transmission signal of the low band is input, and from which the reception signal of the low band is output; a middle band terminal to which the transmission signal of the middle band is input, and from which the reception signal of the middle band is output; a high band terminal to which the transmission signal of the high band is input, and from which the reception signal of the high band is output; and a separating circuit that passes the transmission signal and the reception signal of the low band between the first antenna terminal and the low band terminal, suppresses the transmission signal and the reception signal of the middle band and the transmission signal and the reception signal of the high band between the first antenna terminal and the low band terminal, passes the transmission signal and the reception signal of the high band between the first antenna terminal and the high band terminal, and suppresses the transmission signal and the reception signal of the low band and the transmission signal and the reception signal of the middle band between the first antenna terminal and the high band terminal.

According to another aspect of the present invention, there is provided a module including: the above front end circuit.

According to another aspect of the present invention, there is provided a communication device including: the above front end circuit.

According to another aspect of the present invention, there is provided a module including: a first transmit filter that passes a transmission signal of a first band; a first receive filter that passes a reception signal of the first band; a second transmit filter that passes a transmission signal of a second band; a second receive filter that passes a reception signal of the second band; a third transmit filter that passes a transmission signal of a third band; and a third receive filter that passes a reception signal of the third band, wherein a transmit band of the first band overlaps with at least a part of a receive band of the second band, a receive band of the third band does not overlap with the transmit band of the first band or a transmit band of the second band, and the third receive filter is located between the first receive filter and the second receive filter.

According to another aspect of the present invention, there is provided a module including: a first transmit filter that passes a transmission signal of a first band; a first receive filter that passes a reception signal of the first band; a second transmit filter that passes a transmission signal of a second band; a second receive filter that passes a reception signal of the second band; a third transmit filter that passes a transmission signal of a third band; a third receive filter that passes a reception signal of the third band; a fourth transmit filter that passes a transmission signal of a fourth band; and a fourth receive filter that passes a reception signal of the fourth band, wherein the reception signal of the first band and the reception signal of the second band are simultaneously received, a receive band of the third band overlaps with at least a part of a transmit band of the first band; a receive band of the fourth band does not overlap with the transmit band of the first band or a transmit band of the second band, and the fourth receive filter is located between the second receive filter and the third receive filter.

According to another aspect of the present invention, there is provided a module including: at least three first filters that are connected between one first common terminal and a corresponding one of at least three first terminals, and have different passbands; at least one second filter that is connected between one second common terminal and at least one second terminal; a first wiring line that connects the one first common terminal to the at least three first filters; and a second wiring line that connects the one second common terminal to the at least one second filter, wherein the first common terminal and the second common terminal are located at a same side as the at least three first filters, the at least one second filter is opposite the first common terminal and the second common terminal across the at least three first filters, and the second wiring line intersects with the first wiring line only in a single region.

BRIEF DESCRIPTION OF THE DRAWINGS

FIG. 1 illustrates a transmit band and a receive band of each of bands used in first through fifth embodiments;

DETAILED DESCRIPTION

Figure 2:
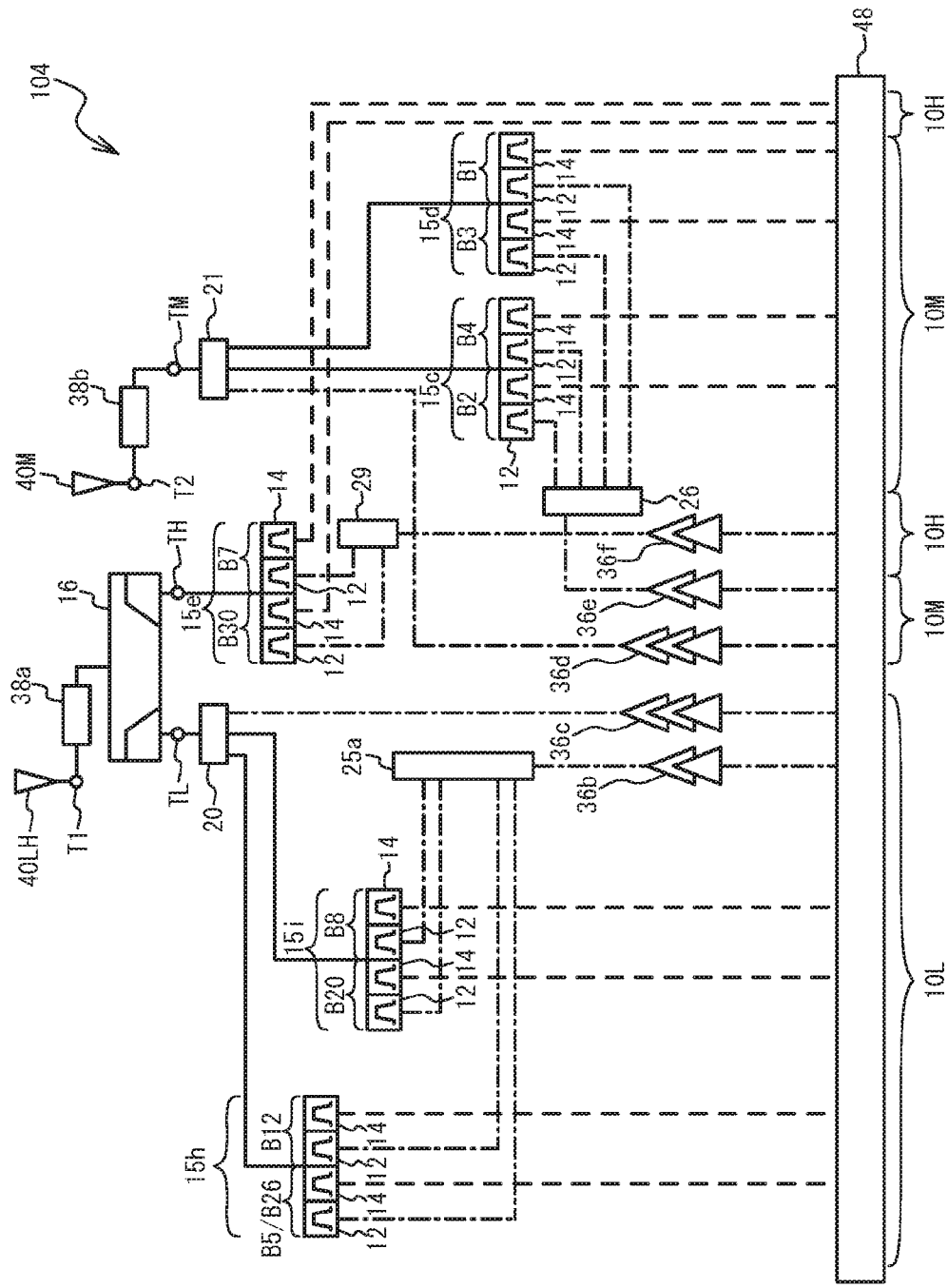
FIG. 2 is a circuit diagram of a front end circuit in accordance with the first embodiment.

Hereinafter, a description will be given of embodiments with reference to accompanying drawings. The LTE band used in the embodiments is a frequency band that supports the LTE standard (E-UTRA Operating Band).

First Embodiment

A first embodiment is an exemplary front end circuit that performs so-called carrier aggregation that simultaneously receives reception signals of multiple bands and/or simultaneously transmits transmission signals of multiple bands. As the multiple bands, used are LTE bands B1, B2 (or B25), B3, B4, B5 (or B26), B7, B8, B12 (or B17), B13, B20, and B30. "B" is affixed to the number indicating the band to distinguish from the reference numerals.

FIG. 1 illustrates the transmit band and the receive band of each of the bands used in the first through fifth embodiments. As illustrated in FIG. 1, LTE bands B5, B8, B12, B13, B17, B20, B26, and B29 are low bands. LTE bands B1 through B4, and B25 are middle bands, and LTE bands B7 and B30 are high bands.

FIG. 2 is a circuit diagram of a communication device and a front end circuit in accordance with the first embodiment. The chain line indicates a line through which a transmission signal is mainly transmitted, the dashed line indicates a line through which a reception signal is mainly transmitted, and the solid line indicates a line through which a transmission signal and a reception signal are transmitted. As illustrated in FIG. 2, a front end circuit 104 mainly includes terminals T1 (a first antenna terminal), T2 (a second antenna terminal), TL (a low band terminal), TM (a middle band terminal), and TH (a high band terminal), a diplexer 16, a low band circuit 10L, a middle band circuit 10M, a high band circuit 10H, and an RFIC (Radio Frequency Integrated Circuit) 48. The communication device includes the front end circuit 104, and antennas 40LH and 40M.

The terminal T1 is coupled to the antenna 40LH, and the terminal T2 is coupled to the antenna 40M. The transmission signal of the low band is input to the terminal TL, and the reception signal of the low band is output from the terminal TL. The transmission signal of the middle band is input to the terminal TM, and the reception signal of the middle band is output from the terminal TM. The transmission signal of the high band is input to the terminal TH, and the reception signal of the high band is output from the terminal TH. The diplexer 16 is coupled to the terminals T1, TL, and TH. The terminal T2 is coupled to the terminal TM. A tuner 38a is connected between the terminal T1 and the diplexer 16, and a tuner 38b is connected between the terminal T2 and the terminal TM. The tuner 38a matches impedance when the impedance of the antenna 40LH changes, and the tuner 38b matches impedance when the impedance of the antenna 40M changes. The tuners 38a and 38b may be omitted. A coupler used to feedback a part of the transmission signal may be located between the terminal T1 and the diplexer 16 and/or between the terminals T2 and TM.

The diplexer 16 includes a low-pass filter connected between the terminals T1 and TL, and a high-pass filter connected between the terminals T1 and TH. This configuration allows the diplexer 16 to pass the transmission signal and the reception signal of the low band between the terminal T1 and the terminal TL, and suppresses the transmission signals and the reception signals of the middle band and the high band between the terminal T1 and the terminal TL. The diplexer 16 passes the transmission signal and the reception signal of the high band between the terminal T1 and the terminal TH, and suppresses the transmission signals and the reception signals of the low band and the middle band between the terminal T1 and the terminal TH.

The terminal TL connects to the low band circuit 10L, the terminal TM connects to the middle band circuit 10M, and the terminal TH connects to the high band circuit 10H. The low band circuit 10L, the middle band circuit 10M, and the high band circuit 10H connect to the RFIC 48. The RFIC 48 transmits a transmission signal before amplified to the low band circuit 10L, the middle band circuit 10M, and the high band circuit 10H. The RFIC 48 includes a low noise amplifier, and amplifies reception signals received from the low band circuit 10L, the middle band circuit 10M, and the high band circuit 10H.

The low band circuit 10L includes quadplexers 15h, 15i, a switch 20, and power amplifiers 36b and 36c. The middle band circuit 10M includes quadplexers 15c, 15d, switches 21, 26, and power amplifiers 36d and 36e. The high band circuit 10H includes a quadplexer 15e, a switch 29, and a power amplifier 36f.

The quadplexer 15h includes a transmit filter 12 and a receive filter 14 for LTE band B5/B26, and the transmit filter 12 and the receive filter 14 for LTE band B12. The filter 12 and the receive filter 14 for LTE band B20. The quadplexer 15c includes the transmit filter 12 and the receive filter 14 for LTE band B2, and the transmit filter 12 and the receive filter 14 for LTE band B4. The quadplexer 15d includes the transmit filter 12 and the receive filter 14 for LTE band B1, and the transmit filter 12 and the receive filter 14 for LTE band B3. The quadplexer 15e includes the transmit filter 12 and the receive filter 14 for LTE band B7, and the transmit filter 12 and the receive filter 14 for LTE band B30.

The transmit filter 12 is a bandpass filter, passes the transmission signal in the corresponding band, and suppresses the reception signal. The receive filter 14 is a bandpass filter, passes the reception signal in the corresponding band, and suppresses the transmission signal. The transmission band of LTE band B5 overlap with the transmission band of LTE band B26, and the reception band of LTE band B5 overlap with the reception band of LTE band B26. Thus, the transmit filter 12 and the receive filter 14 for LTE band B5/B26 can be shared by LTE bands B5 and B26.

The SP3T (Single Pole 3 Throw) switch 20 selects one of the outputs from the common terminals of the quadplexers 15h and 15i and from the power amplifier 36c for GSM (global system for mobile communications) (registered trademark) of the low band, and connects the selected output to the terminal TL. A transmission signal is output from the RFIC 48 to the power amplifiers 36b through 36f. A SP4T (Single Pole 4 Throw) switch 25a outputs the output of the power amplifier 36b to one of the transmit filters 12 for LTE bands B5/B26, B12, B8, and B20.

The SP3T switch 21 selects one of the outputs from the common terminals of the quadplexers 15c and 15d and from the power amplifier 36d for GSM (registered trademark) of the high band, and connects the selected output to the terminal TM. A SP4T (Single Pole 4 Throw) switch 26 outputs the output of the power amplifier 36e to one of the transmit filters 12 for LTE bands B2, B1, B4, and B3. The SPDT switch 29 outputs the output of the power amplifier 36f to one of the transmit filters 12 for LTE bands B7 and B30.

Figure 3:
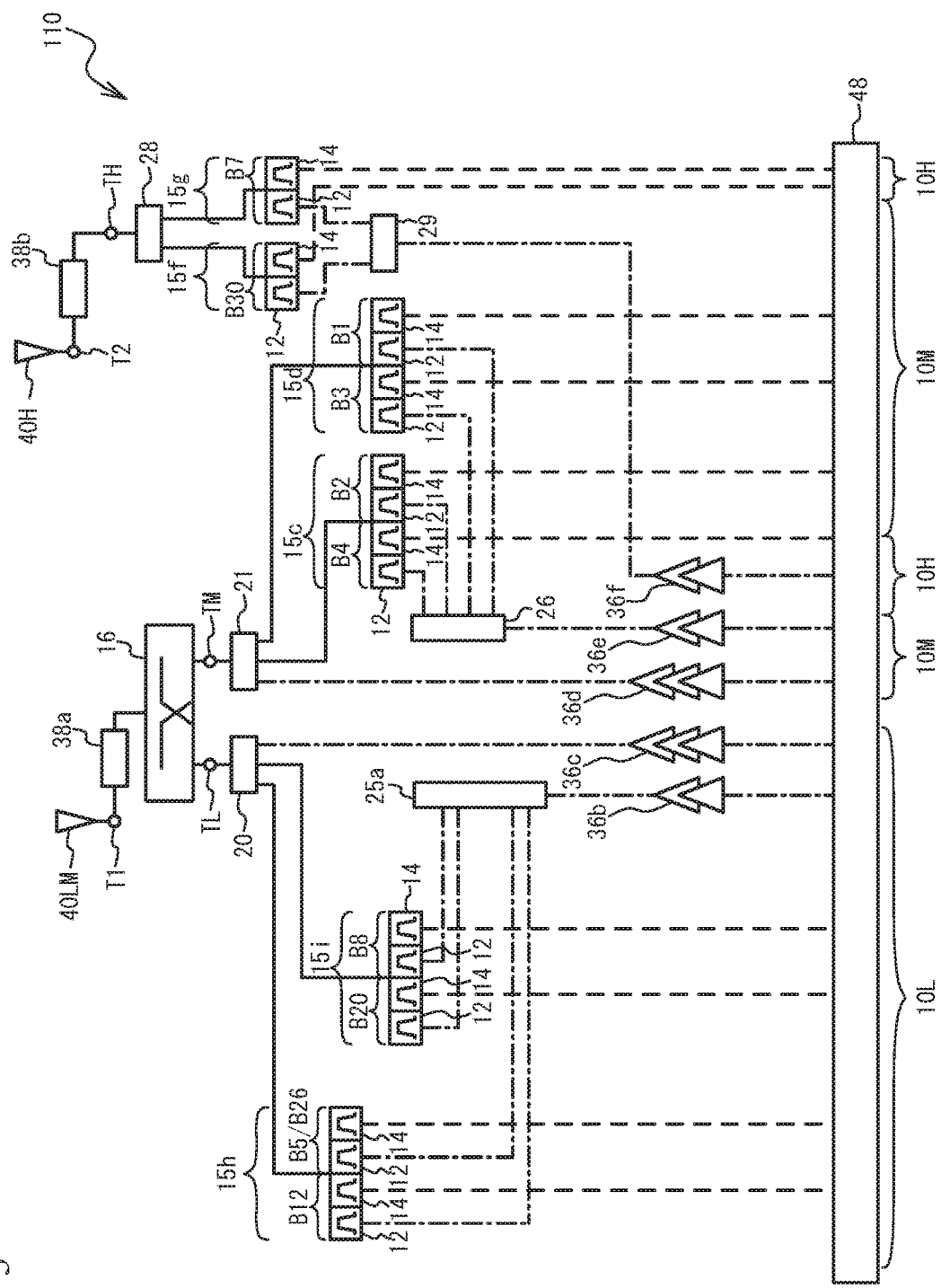
FIG. 3 is a circuit diagram of a front end circuit in accordance with a first comparative example.

To explain the advantage of the first embodiment, a description will be given of comparative examples. FIG. 3 is a circuit diagram of a front end circuit in accordance with a first comparative example. As illustrated in FIG. 3, in a front end circuit 110, the terminal T1 is coupled to an antenna 40LM. The diplexer 16 is connected between the terminal T1 and the terminal TL, and between the terminal T1 and the terminal TM. The terminal T2 is coupled to an antenna 40H. The terminal T2 is coupled to the terminal TH. Instead of the quadplexer 15e, duplexers 15f, 15g and an SPDT switch 28 are provided. Other configurations are the same as those of the first embodiment, and thus the description thereof is omitted.

Figure 4:
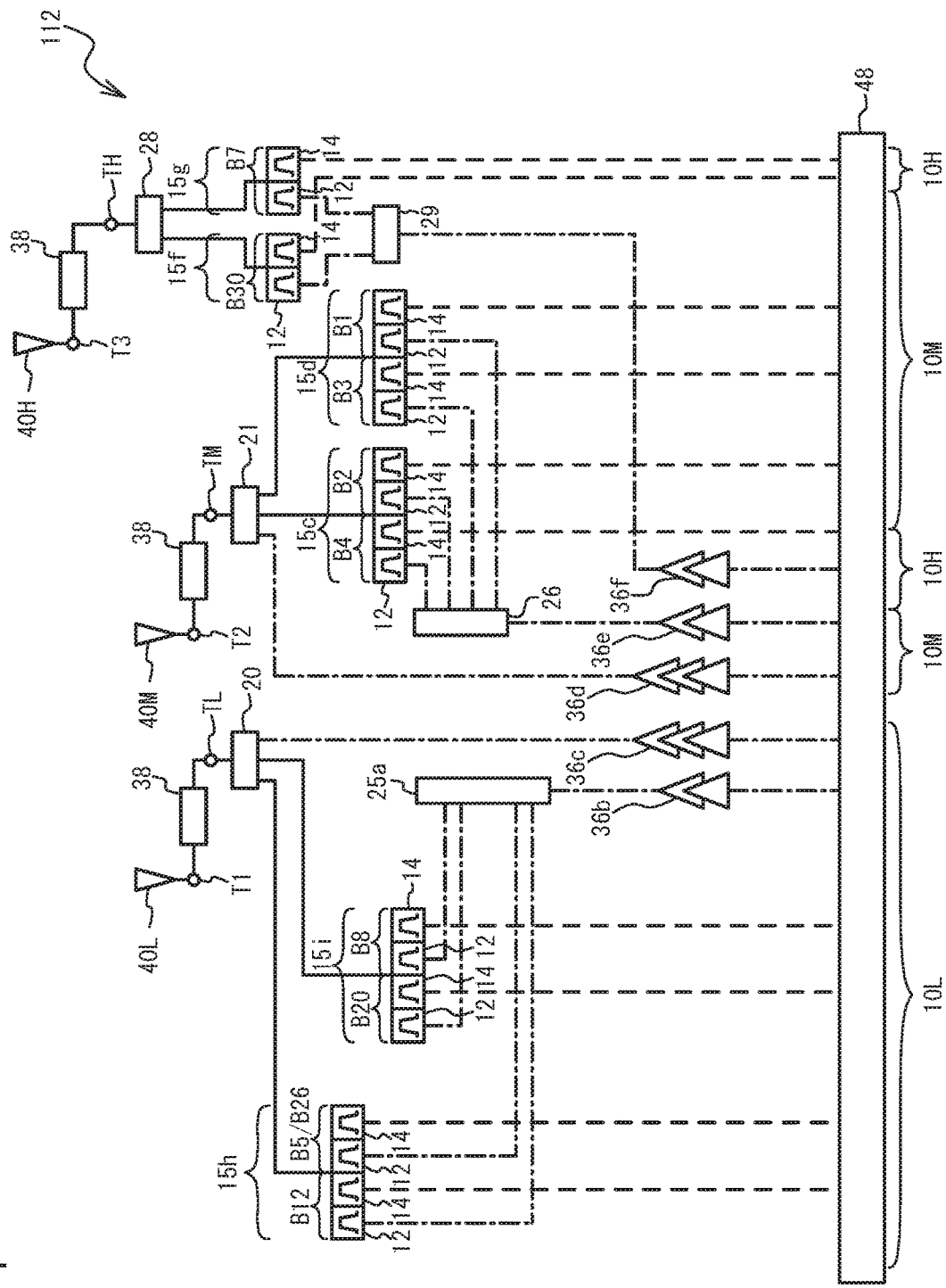
FIG. 4 is a circuit diagram of a front end circuit in accordance with a second comparative example.

FIG. 4 is a circuit diagram of a front end circuit in accordance with a second comparative example. As illustrated in FIG. 4, in a front end circuit 112, the terminal T1 is coupled to an antenna 40L and to the terminal TL. The terminal T2 is coupled to the middle band antenna 40M and to the terminal TM. A terminal T3 is coupled to the antenna 40H and to the terminal TH. Tuners 38 are connected between the antenna 40L and the terminal TL, between the antenna 40M and the terminal TM, and between the antenna 40H and the terminal TH. Other configurations are the same as those of the first comparative example, and thus the description thereof is omitted.

Figure 5A:
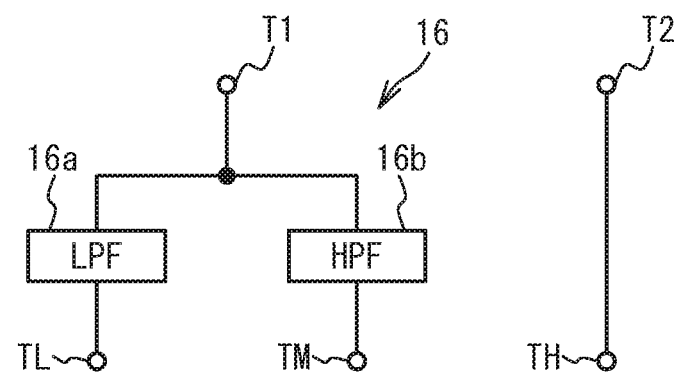
FIG. 5A is a block diagram of a diplexer in accordance with the first comparative example.
Figure 5B:
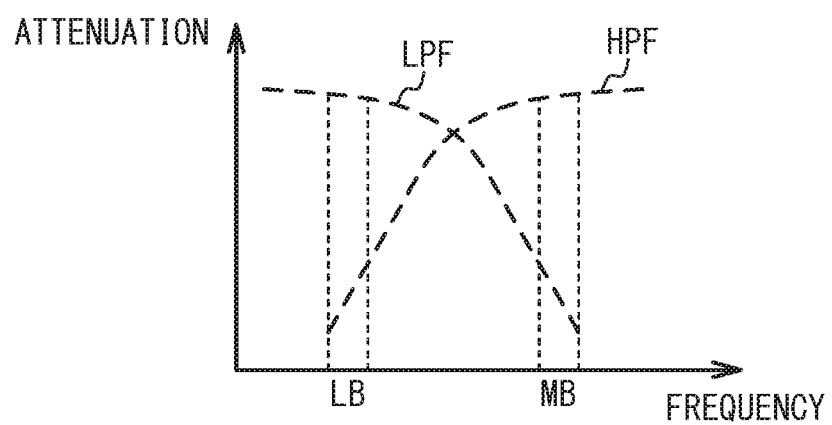
FIG. 5B illustrates the frequency characteristic of the diplexer.

The problem of the first comparative example will be explained. FIG. 5A is a block diagram of a diplexer in the first comparative example, and FIG. 5B illustrates the frequency characteristic of the diplexer. As illustrated in FIG. 5A, the diplexer 16 includes a low-pass filter (LPF) 16a and a high-pass filter (HPF) 16b. The LPF 16a is connected between the terminals T1 and TL. The HPF 16b is connected between the terminals T1 and TM. As described above, the first comparative example uses the diplexer 16 to separate the low band LB and the middle band MB. As described above, the use of the diplexer 16 allows the antenna to be shared.

As illustrated in FIG. 5B, the low band LB is the passband of the LPF 16a, and is the suppression band of the HPF 16b. The middle band MB is the passband of the HPF 16b, and is the suppression band of the LPF 16a. However, the suppression characteristic of the HPF 16b in the low band LB and/or the suppression characteristic of the LPF 16a in the middle band MB is not sufficient. Thus, to achieve the sufficient suppression, the loss of the LPF 16a in the low band LB and/or the loss of the HPF 16b in the middle band MB increases. Accordingly, the power of the transmission signal in the terminals TL and TM needs to be increased. This increases the electrical power consumption of the power amplifier. In addition, when the power of the transmission signal is large, harmonic signals, intermodulation distortion, or/and cross modulation distortion generated in the power amplifier, the switch, and the filter for the low band LB increase. They interfere with the middle band MB and/or the high band HB.

Furthermore, the loss of the LPF 16a in the low band LB and/or the loss of the HPF 16b in the middle band MB is large. Thus, the level of the reception signal in the terminals TL and TM decreases.

Figure 6A:
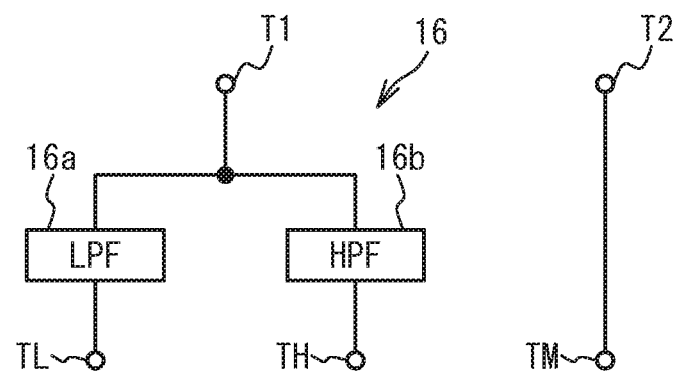
FIG. 6A is a block diagram of a diplexer in accordance with the first embodiment.
Figure 6B:
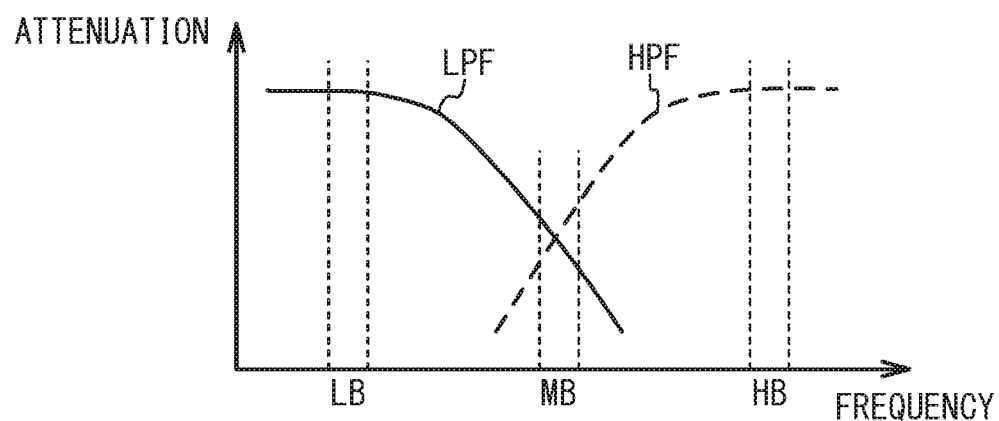
FIG. 6B illustrates the frequency characteristic of the diplexer.

FIG. 6A is a block diagram of the diplexer in the first embodiment, and FIG. 6B illustrates the frequency characteristic of the diplexer. As illustrated in FIG. 6A, the LPF 16a is connected between the terminals T1 and TL. The HPF 16b is connected between the terminals T1 and TH. As described above, the first embodiment uses the diplexer 16 to separate the low band LB and the high band HB.

As illustrated in FIG. 6B, the low band LB is the passband of the LPF 16a, and is the suppression band of the HPF 16b. The high band HB is the passband of the HPF 16b, and is the suppression band of the LPF 16a. Since the frequency interval between the low band LB and the high band HB is wide, the suppression characteristic of the HPF 16b in the low band LB and the suppression characteristic of the LPF 16a in the high band HB can be improved. Thus, the loss of the LPF 16a in the low band LB and the loss of the HPF 16b in the high band HB can be reduced. Accordingly, the power of the transmission signal in the terminals TL and TH can be reduced. This decreases the electrical power consumption of the power amplifier. Moreover, since the power of the transmission signal is small, harmonic signals, intermodulation distortion, or/and cross modulation distortion generated in the power amplifier, the switch, and the filter for the low band LB decrease. Thus, these signals can be prevented from interfering with the middle band MB and/or the high band HB.

Furthermore, the loss of the LPF 16a in the low band LB and the loss of the HPF 16b in the high band HB can be reduced. Thus, the level of the reception signal in the terminals TL and TH can be increased.

A problem of the second comparative example will be explained. In the second comparative example, since the antenna terminal T1 and the antenna 40L are provided for the low band LB, the antenna terminal T2 and the antenna 40M are provided for the middle band MB, and the antenna terminal T3 and the antenna 40H are provided for the high band HB, the cost and the size increase. Furthermore, to improve the isolation among three antenna terminals T1 through T3 and/or the isolation among three antennas 40L, 40M, and 40H, the arrangement of the antenna terminals T1 through T3 and/or the three antennas 40L, 40M, and 40H becomes complicated. When it is difficult to arrange the antenna terminals and/or the antennas, a filter needs to be added, and thus the cost further increases.

In the first embodiment, the transmission signals of the low band and the high band are output from the terminal T1, and the reception signals of the low band and the high band are input to the terminal T1. The terminal T2 is connected to an antenna different from the antenna connected to the terminal T1, and the transmission signal of the middle band is output from the terminal T2, and the reception signal of the middle band is input to the terminal T2. The diplexer 16 is used as a separating circuit that separates the low band and the high band.

This configuration reduces the number of antenna terminals, and reduces the number of RF connectors compared to the second comparative example that provides three antenna terminals. Thus, the cost and the size can be reduced. Furthermore, compared to the first comparative example that uses a separating circuit that separates the low band and the middle band to share an antenna terminal by the low band and the middle band, the electrical power consumption can be reduced, the interference of the harmonic signal, the intermodulation distortion signal, and/or the cross modulation distortion signal of the low band with the middle band and/or the high band can be reduced, and the sensitivity of the reception signal can be improved.

Second Embodiment

Figure 7:
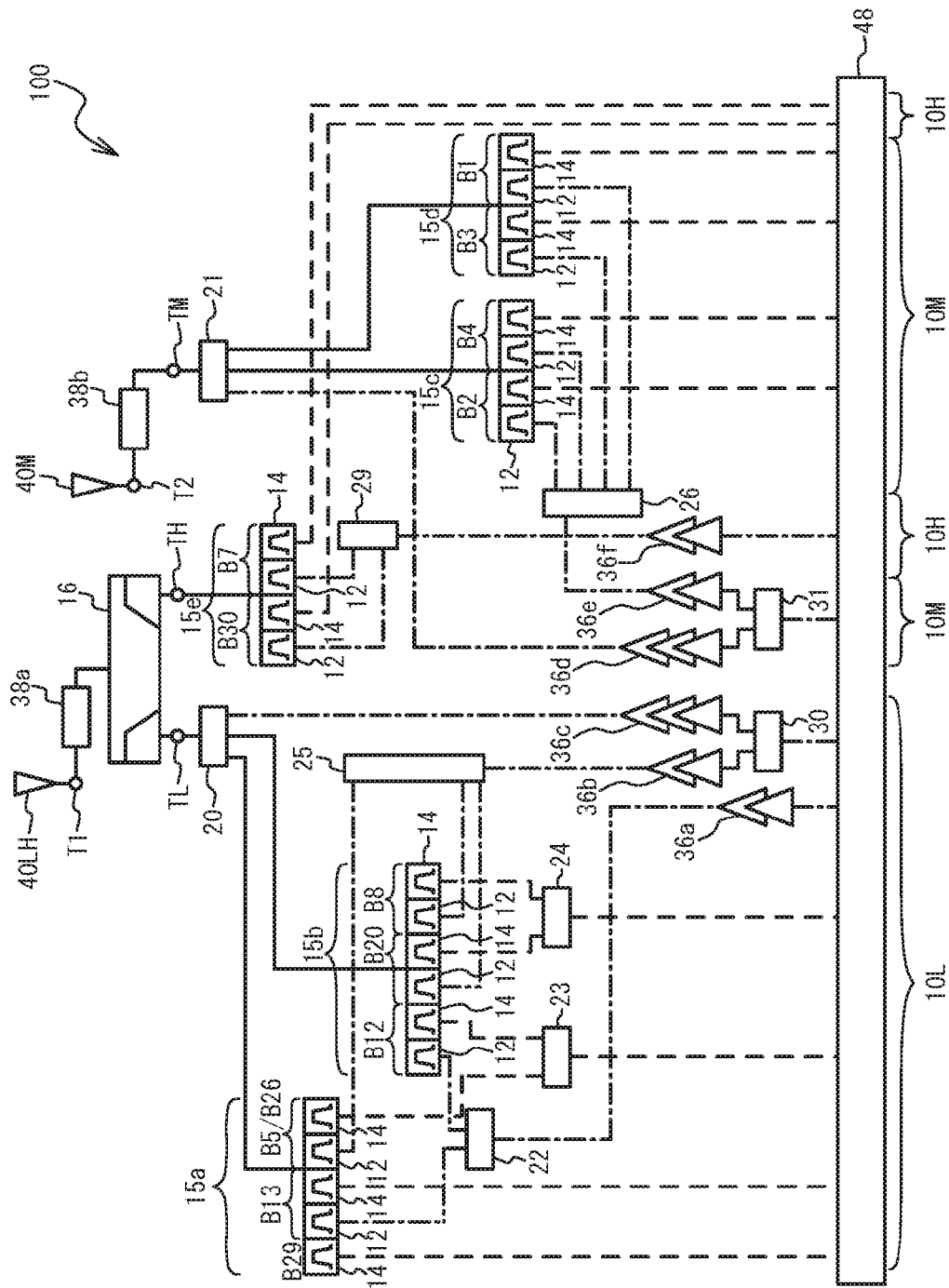
FIG. 7 is a circuit diagram of a front end circuit in accordance with the second embodiment.

FIG. 7 is a circuit diagram of a front end circuit in accordance with the second embodiment. As illustrated in FIG. 7, in a front end circuit 100, the low band circuit 10L includes multiplexers 15a, 15b, switches 20, 22 through 24, 30, and the power amplifiers 36a through 36c. The multiplexer 15a includes the transmit filters 12 and the receive filters 14 for LTE bands B5/B26, B13, and B29. The multiplexer 15b includes the transmit filters 12 and the receive filters 14 for LTE bands B8, B20, and B12.

The SPDT (Single Pole double Throw) switch 22 connects the output of the power amplifier 36a to one of the transmit filters 12 for LTE bands B12 and B13. A SPDT switch 23 selects one of the outputs from the receive filters 14 for LTE bands B12 and B5/B26, and outputs the selected output to the RFIC 48. The SPDT switch 24 selects one of the outputs from the receive filters 14 for LTE bands B8 and B20, and outputs the selected output to the RFIC 48. A SP3T switch 25 outputs the output of the power amplifier 36b to one of the transmit filters 12 for LTE bands B5/B26, B8, and B20.

The SPDT switch 30 outputs the output of the RFIC 48 to one of the power amplifiers 36b and 36c. A SPDT switch 31 outputs the output of the RFIC 48 to one of the power amplifiers 36d and 36e. Other configurations are the same as those of the first embodiment, and thus the description thereof is omitted.

Figure 8:
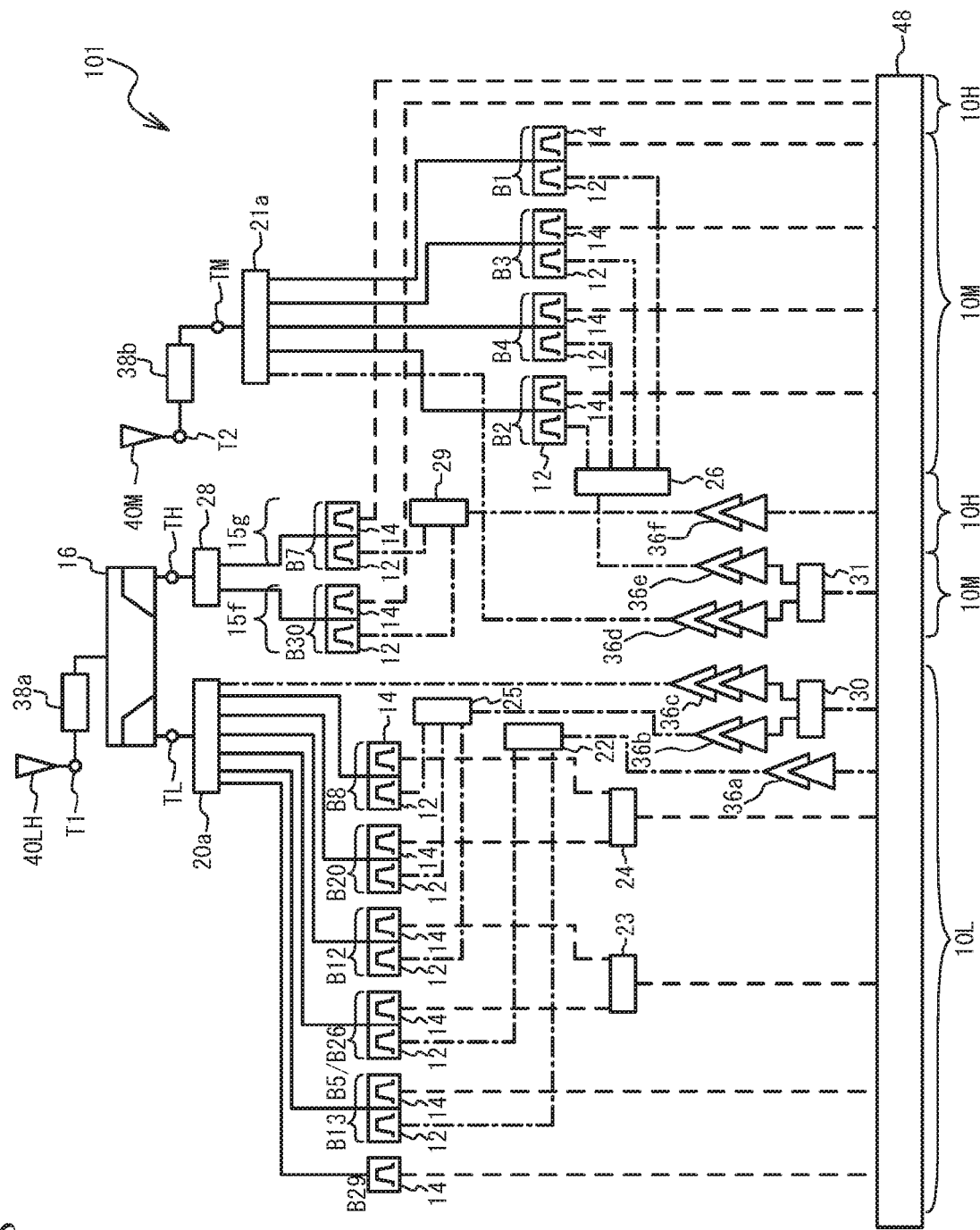
FIG. 8 is a circuit diagram of a front end circuit in accordance with a first variation of the second embodiment.

FIG. 8 is a circuit diagram of a front end circuit in accordance with a first variation of the second embodiment. As illustrated in FIG. 8, in a front end circuit 101, the multiplexers 15a and 15b are replaced with duplexers, and the quadplexers 15c through 15e are replaced with duplexers. Accordingly, the SP3T switch 20 is replaced with a multi-throw RF switch 20a capable of independently switching ON/OFF, and the SP3T switch 21 is replaced with a multi-throw RF switch 21a capable of independently switching ON/OFF. The SPDT switch 28 is located between the terminal TH and the duplexers for LTE bands B30 and B7. Other configurations are the same as those of the second embodiment illustrated in FIG. 7, and thus the description thereof is omitted.

As described in the first variation of the second embodiment, the multiplexers 15a and 15b and the quadplexers 15c through 15e may be replaced with duplexers. Moreover, one or more of the multiplexers 15a and 15b and the quadplexers 15c through 15e may be replaced with duplexers.

Figure 9:
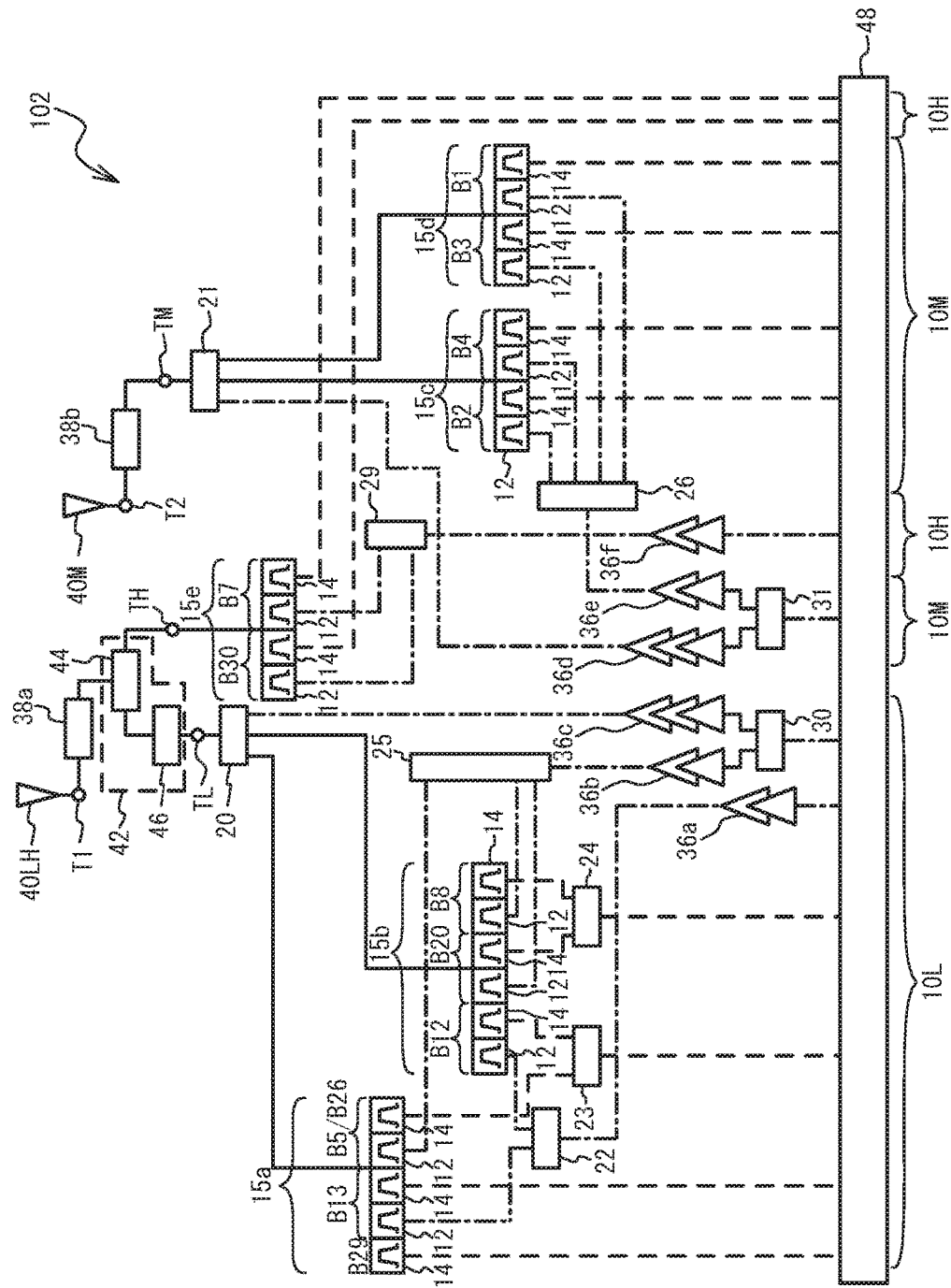
FIG. 9 is a circuit diagram of a front end circuit in accordance with a second variation of the second embodiment.

FIG. 9 is a circuit diagram of a front end circuit in accordance with a second variation of the second embodiment. As illustrated in FIG. 9, in a front end circuit 102, instead of the diplexer 16, a separating circuit 42 is provided. The separating circuit 42 includes a matching circuit 44 and an LPF 46. The matching circuit 44 is located between the terminal T1 and the terminals TL and TH. The LPF 46 is located between the matching circuit 44 and the terminal TL. The separating circuit 42 decreases the impedance in the low band when the terminal TL is viewed from the terminal T1 side, and increases the impedance in the high band. On the other hand, the separating circuit 42 decreases the impedance in the high band when the terminal TH is viewed from the terminal T1 side, and increases the impedance in the low band. As described above, the separating circuit may not be a diplexer.

Figure 10A:
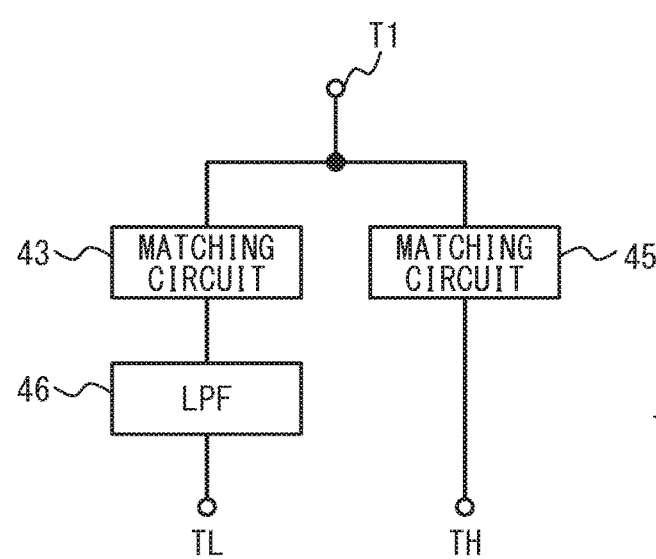
FIG. 10A through FIG. 10D are circuit diagrams illustrating other examples of a separating circuit in the second variation of the second embodiment.
Figure 10B:
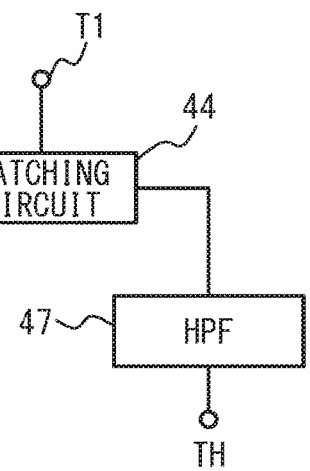
Figure 10C:
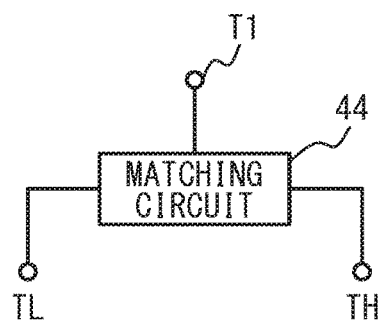
Figure 10D:
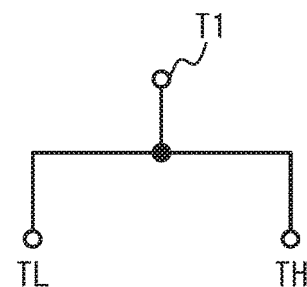

FIG. 10A through FIG. 10D are circuit diagrams illustrating other examples of the separating circuit in the second variation of the second embodiment. As illustrated in FIG. 10A, matching circuits 43 and 45 may be located separately at the terminal TL side and at the terminal TH side, respectively. As illustrated in FIG. 10B, the LPF 46 may be omitted, and an HPF 47 may be located between the terminal T1 and the terminal TH. As described above, one of the LPF 46 and the HPF 47 may be provided. As illustrated in FIG. 10C, the LPF 46 and the HPF 47 may be omitted, and only the matching circuit 44 may be provided. As illustrated in FIG. 10D, the matching circuits 43 through 45, the LPF 46, and the HPF 47 may be omitted. In the case illustrated in FIG. 10D, the circuit including the transmit filter 12 and the receive filter 14 functions as a separating circuit.

As described in the first embodiment, the second embodiment, and the variations thereof, the separating circuit preferably includes the diplexer 16 including an LPF connected between the terminal T1 and the terminal TL and an HPF connected between the terminal T1 and the terminal TH. This configuration enables to further separate signals of the low band and signals of the high band. As described in the second variation of the second embodiment, the separating circuit may not include a diplexer.

The first and second embodiments and the variations thereof describe a case where, as the bands used for wireless communication such as LTE, the low band includes at least a part of a band from 699 to 960 MHz, the middle band includes at least a part of a band from 1710 to 2170 MHz, and the high band includes at least a part of a band from 2305 to 2690 MHz, as an example. The low band, the middle band, and the high band may be other than these frequencies.

A description has been given of a case where each of the low band, the middle band, and the high band includes two or more bands each including a transmit band and a receive band, as an example. At least one of the low band, the middle band, and the high band may include two or more bands each including a transmit band and a receive band. Each of the low band, the middle band, and the high band may include only one band.

In the second embodiment and the variations thereof, the switches 23 and 24 may be replaced with multiplexers such as diplexers. This reduces the number of wiring lines for the power source and control signals used for the switch. Accordingly, the size of the front end circuit can be reduced.

Third Embodiment

Figure 11:
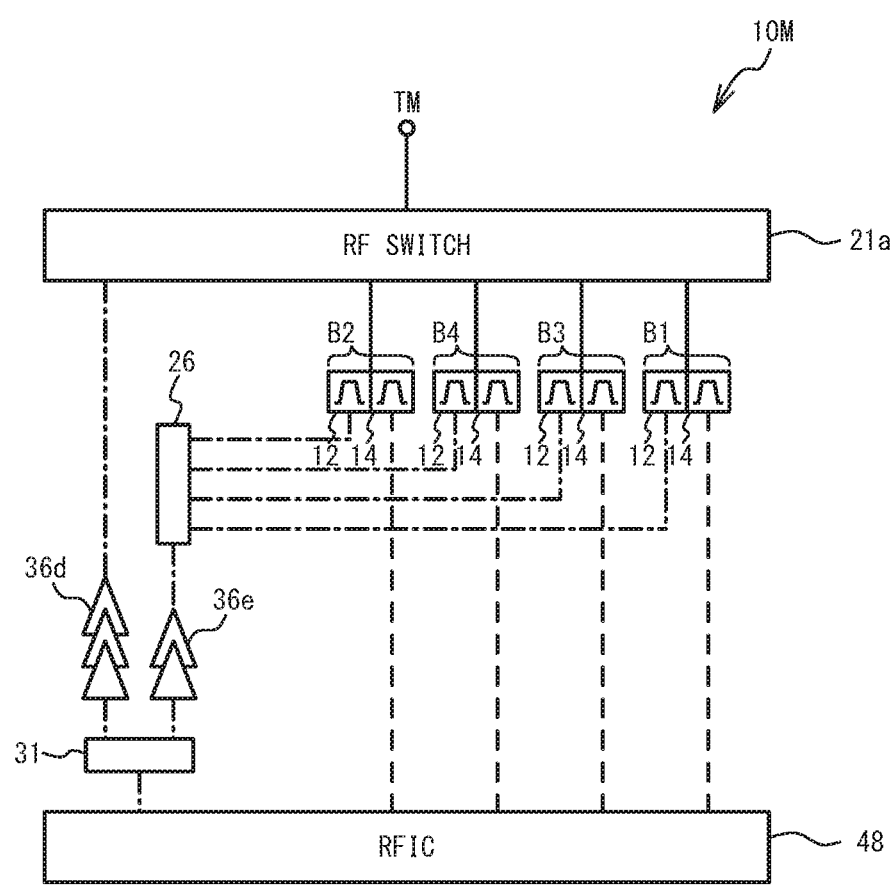
FIG. 11 is a circuit diagram of a middle band circuit in the third embodiment.

The third embodiment is an exemplary module including a front end circuit or a part of the front end circuit. FIG. 11 is a circuit diagram of a middle band circuit in the third embodiment. As illustrated in FIG. 11, a circuit of the third embodiment is the same as the middle band circuit 10M of the first variation of the second embodiment.

Figure 12A:
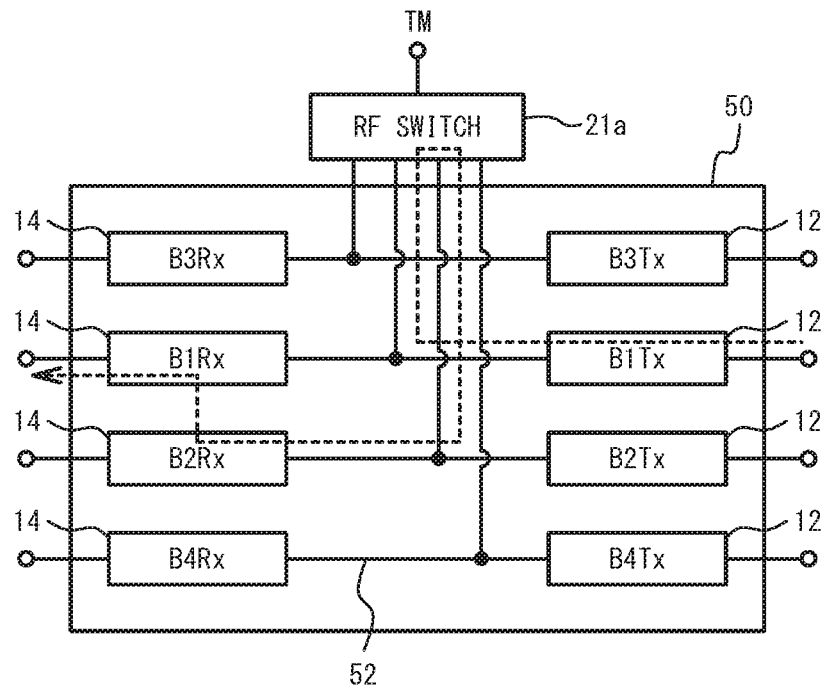
FIG. 12A and FIG. 12B illustrate a module in accordance with a third comparative example.
Figure 12B:
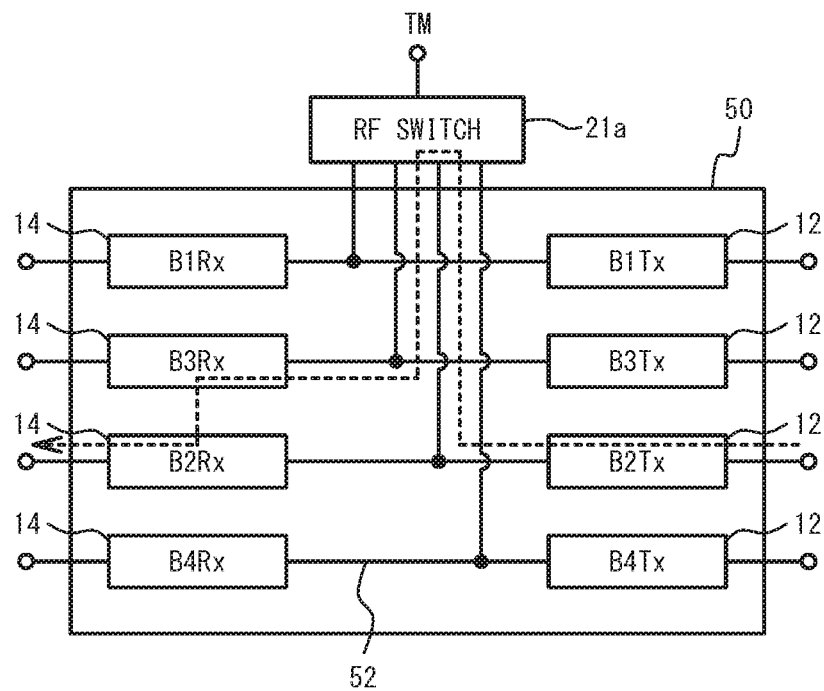

FIG. 12A and FIG. 12B illustrate a module in accordance with a third comparative example. As illustrated in FIG. 12A and FIG. 12B, the module includes a substrate 50, the transmit filters 12, and the receive filters 14. The transmit filters 12 and the receive filters 14 are mounted on the substrate 50, or embedded in the substrate 50. The substrate 50 is a wiring substrate formed by stacking, for example, resin layers. The transmit filter 12 and the receive filter 14 are interconnected through a wiring line 52 formed in the substrate 50. B1Rx through B4Rx correspond to the receive filters 14 for LTE bands B1 through B4, respectively, and B1Tx through B4Tx correspond to the transmit filters 12 for LTE bands B1 through B4, respectively.

As illustrated in FIG. 1, the transmit band of LTE band B1 partially overlap with the receive band of LTE band B2. As indicated by the dashed line arrow in FIG. 12A, a signal input from the transmit terminal for LTE band B1 is input to the switch 21a. Since the isolation in the switch 21a is finite, a part of the transmission signal of LTE band B1 leaks to the receive filter 14 for LTE band B2. When the receive filters 14 for LTE bands B2 and B1 are adjacent to each other, the coupling between LTE bands B2 and B1 is large. Thus, the signal of the receive filter 14 for LTE band B2 (a part of the transmission signal of LTE band B1) is output as the reception signal of LTE band B1. This decreases the receiving sensitivity of LTE band B1.

In the same manner, the transmit band of LTE band B2 partially overlaps with the receive band of LTE band B3. As indicated by the dashed line arrow in FIG. 12B, a signal input from the transmit terminal for LTE band B2 is input to the switch 21a. A part of the transmission signal of LTE band B2 leaks to the receive filter 14 for LTE band B3. When the receive filters 14 for LTE bands B3 and B2 are adjacent to each other, the signal of the receive filter 14 for LTE band B3 (a part of the transmission signal of LTE band B2) is output as the reception signal of LTE band B2. This decreases the receiving sensitivity of LTE band B2.

Figure 13:
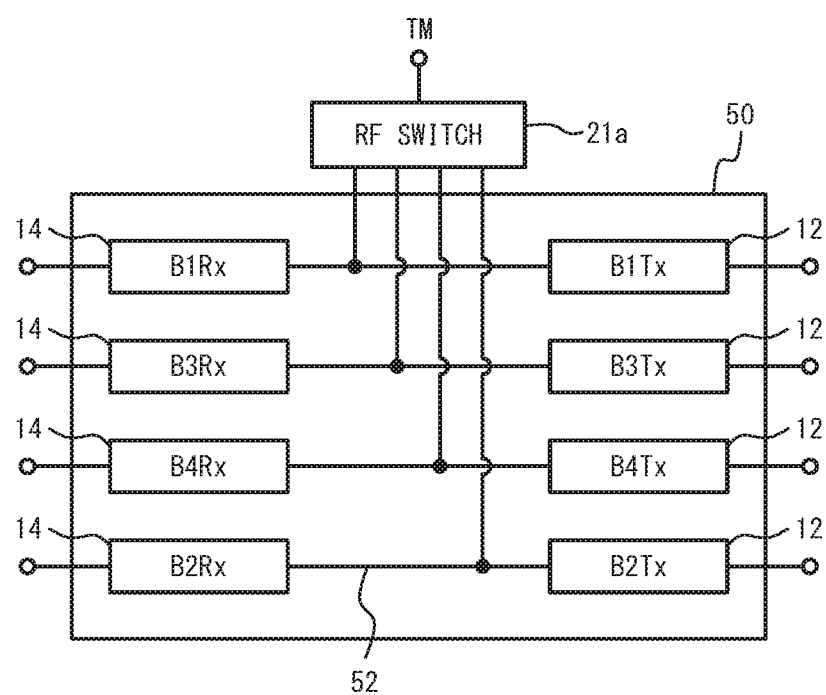
FIG. 13 is a schematic plan view illustrating a module in accordance with the third embodiment.

FIG. 13 is a schematic plan view illustrating a module in accordance with the third embodiment. The transmit filters 12 and the receive filters 14 for LTE bands B1 through B4 are mounted on the substrate 50, or embedded in the substrate 50. The multi-throw RF switch 21a is located outside the module. The receive filters 14 are located in the order of LTE bands B1, B3, B4, and B2. Thus, the receive filters 14 for LTE bands B1 and B2 are not adjacent to each other, and the receive filters 14 for LTE bands B2 and B3 are not adjacent to each other. This configuration can reduce the degradation in the receiving sensitivity of LTE bands B1 and B2 described in FIG. 12A and FIG. 12B.

Figure 14:
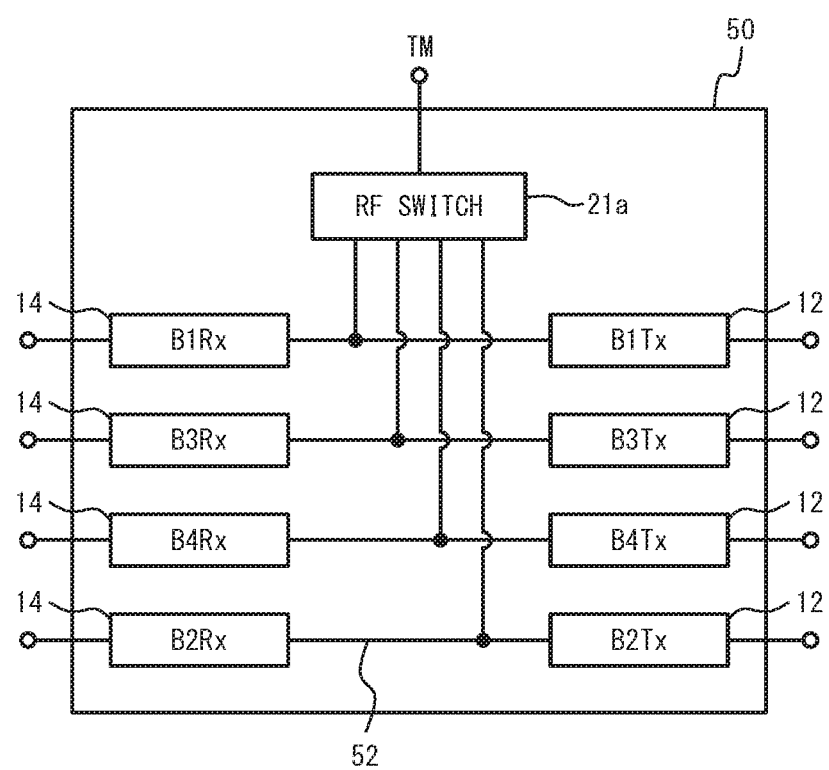
FIG. 14 is a schematic plan view illustrating a module in accordance with a first variation of the third embodiment.

FIG. 14 is a schematic plan view illustrating a module in accordance with a first variation of the third embodiment. As illustrated in FIG. 14, the switch 21a is mounted on or embedded in the substrate 50. Other configurations are the same as those of the third embodiment, and thus the description thereof is omitted.

Figure 15:
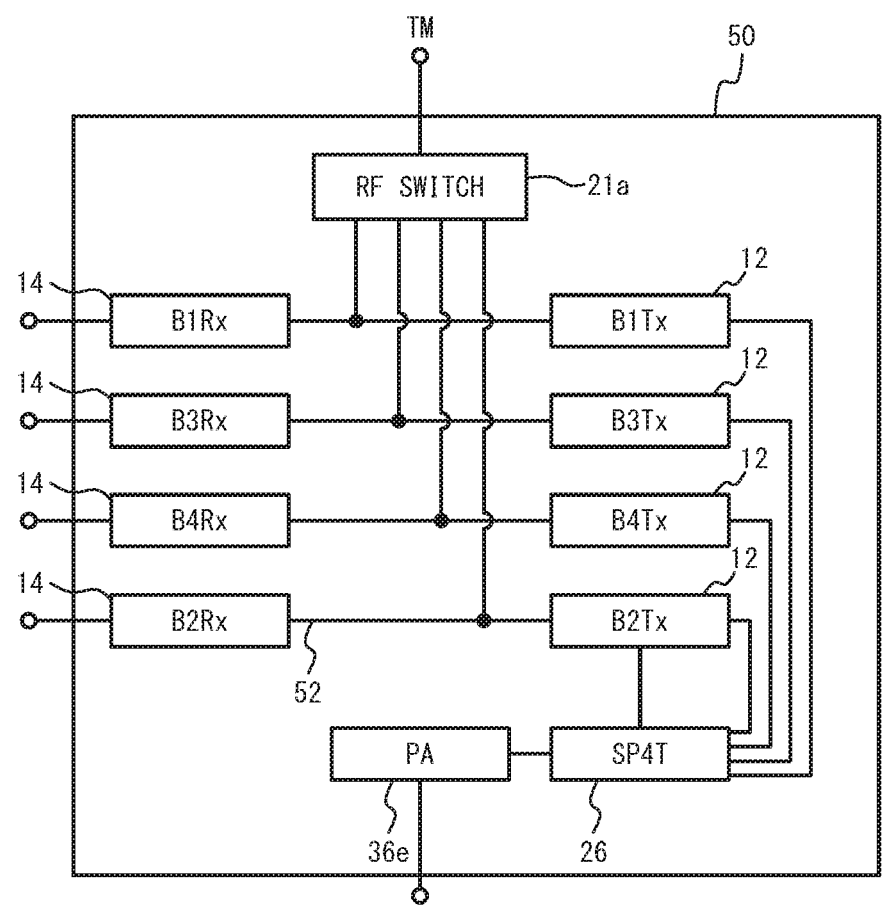
FIG. 15 is a schematic plan view illustrating a module in accordance with a second variation of the third embodiment.

FIG. 15 is a schematic plan view illustrating a module in accordance with a second variation of the third embodiment. As illustrated in FIG. 15, the switch 26 and the power amplifier 36e are mounted on or embedded in the substrate 50. Other configurations are the same as those of the first variation of the third embodiment, and thus the description thereof is omitted.

As illustrated in FIG. 14 and FIG. 15, at least one of the switches 21a, 26 and the power amplifier 36e may be mounted on or embedded in the substrate 50 in addition to the transmit filters 12 and the receive filters 14. Alternatively, other components may be mounted on or embedded in the substrate 50.

Figure 16:
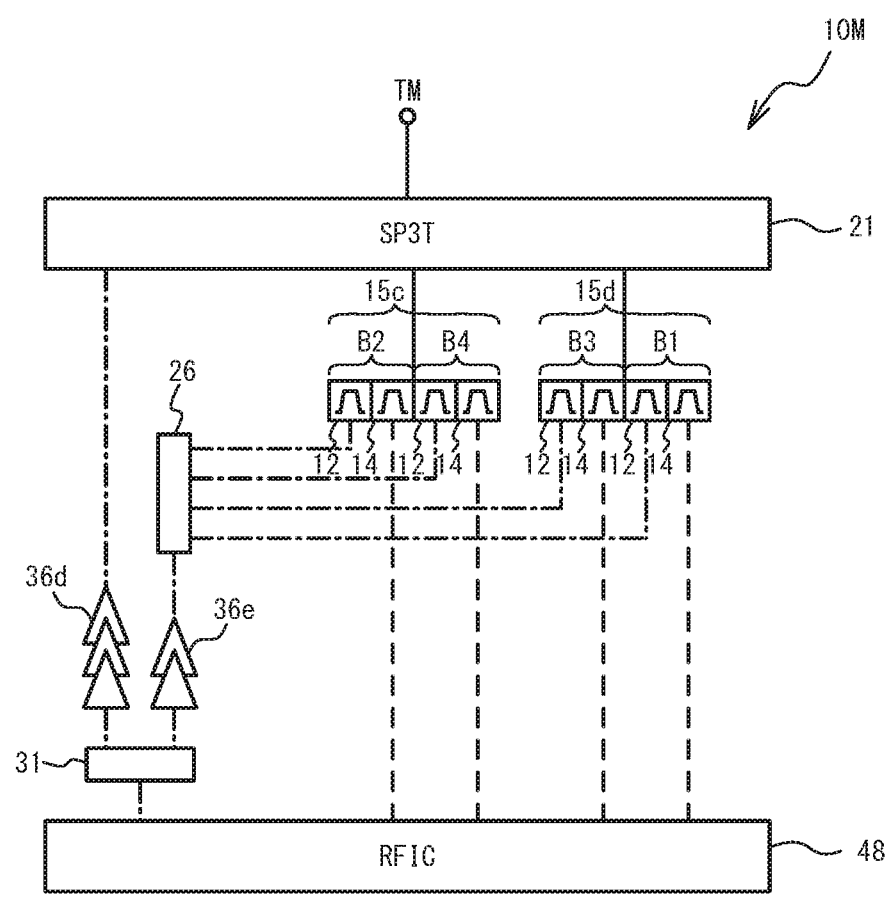
FIG. 16 is a circuit diagram of a middle band circuit in a third variation of the third embodiment.

FIG. 16 is a circuit diagram of a middle band circuit in a third variation of the third embodiment. As illustrated in FIG. 16, the transmit filters 12 and the receive filters 14 for LTE bands B2 and B4 are included in the quadplexer 15c. The transmit filters 12 and the receive filters 14 for LTE bands B1 and B3 are included in the quadplexer 15d. The multi-throw RF switch 21a is replaced with the SP3T switch 21. Other configurations are the same as those of the third embodiment, and thus the description thereof is omitted. The isolation between Throws in a switch such as a SP3T having a small number of Throws is greater than that in a switch having a large number of Throws. Thus, the third variation of the third embodiment can further reduce the interference between bands.

Even when the transmit filters 12 and the receive filters 14 form a multiplexer such as a quadplexer as described in the third variation of the third embodiment, the receive filters 14 for LTE bands B1 and B2 are preferably not adjacent to each other, and the receive filters 14 for LTE bands B2 and B3 are preferably not adjacent to each other.

Figure 17:
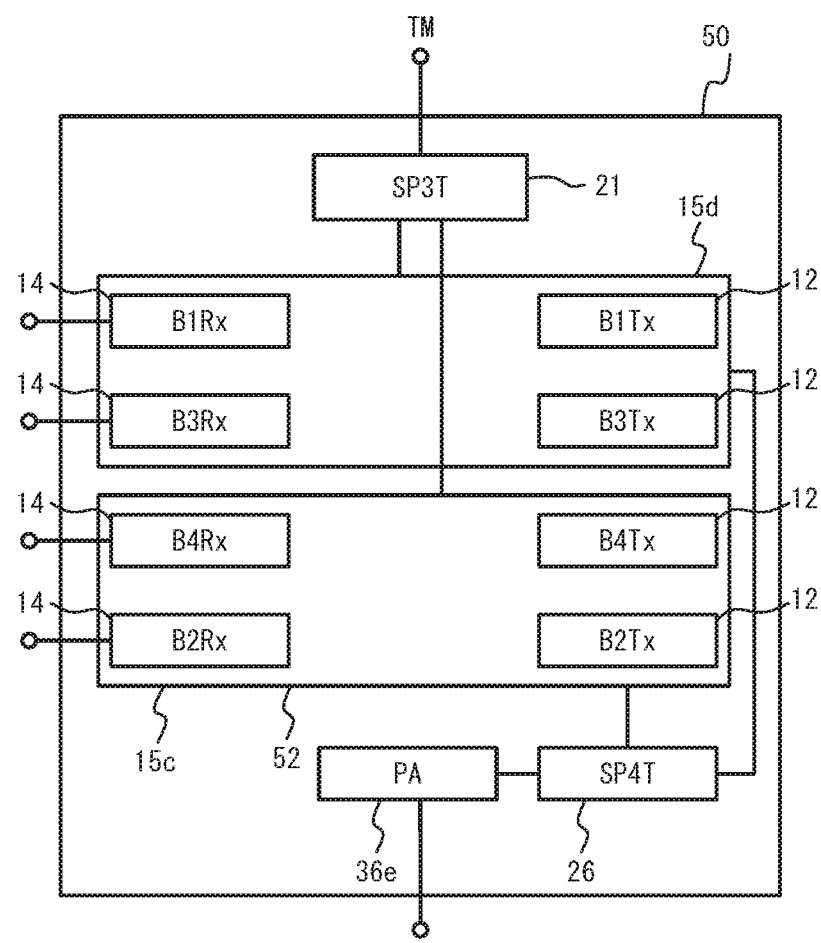
FIG. 17 is a schematic plan view illustrating a module in accordance with the third variation of the third embodiment.

FIG. 17 is a schematic plan view illustrating a module in accordance with the third variation of the third embodiment. As illustrated in FIG. 17, the transmit filters 12 and the receive filters 14 for LTE bands B1 and B3 are mounted on the substrate 50 as the quadplexer 15d. The transmit filters 12 and the receive filters 14 for LTE bands B2 and B4 are mounted on the substrate 50 as the quadplexer 15c. Each of the quadplexers 15c and 15d is packaged. Other configurations are the same as those of the second variation of the second embodiment, and thus the description thereof is omitted. Even when the transmit filters 12 and the receive filters 14 are mounted on the substrate 50 as the quadplexers 15c and 15d, the receive filters 14 for LTE bands B1 and B2 are configured not to be adjacent to each other, and the receive filters 14 for LTE bands B2 and B3 are configured not to be adjacent to each other. This configuration enables to reduce the deterioration in the isolation between LTE bands B2 and B3. The same applies to a case where the transmit filters 12 and the receive filters 14 are packaged in a unit of a duplexer or in a unit of a filter.

Figure 18:
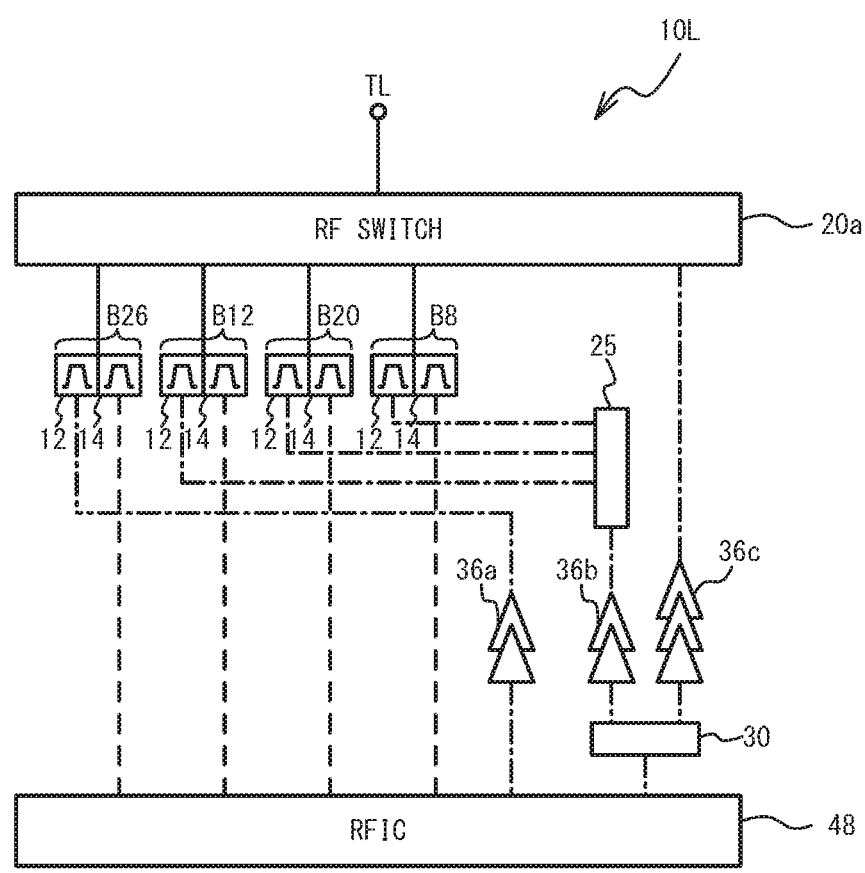
FIG. 18 is a circuit diagram of a low band circuit in a fourth variation of the third embodiment.

FIG. 18 is a circuit diagram of a low band circuit in a fourth variation of the third embodiment. As illustrated in FIG. 18, the circuit of the fourth variation of the third embodiment includes duplexers for LTE bands B8, B20, B12, and B26 in the low band circuit 10L of the first variation of the second embodiment. The multi-throw RF switch 20a having seven throws of the first variation of the second embodiment is replaced with the multi-throw RF switch 20a having five throws. Other configurations are the same as those of the first variation of the second embodiment, and thus the description thereof is omitted.

Figure 19:
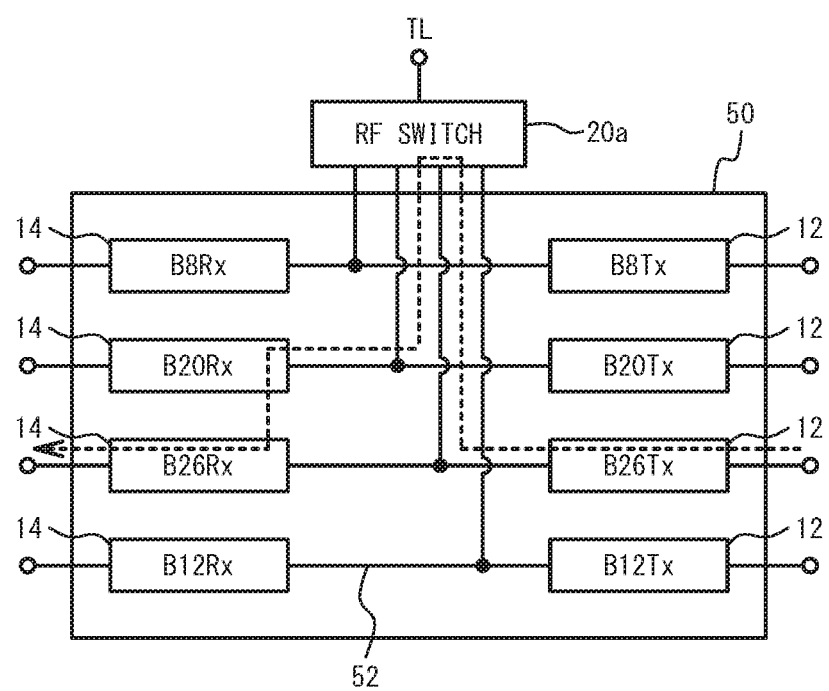
FIG. 19 is a schematic plan view illustrating a module in accordance with a fourth comparative example.

FIG. 19 is a schematic plan view illustrating a module in accordance with a fourth comparative example. As illustrated in FIG. 19, the module includes the substrate 50, the transmit filters 12, and the receive filters 14. The transmit filters 12 and the receive filters 14 are mounted on or embedded in the substrate 50. The substrate 50 is a wiring substrate formed by stacking, for example, resin layers. The transmit filter 12 and the receive filter 14 are interconnected through the wiring line 52 formed in the substrate 50. The transmit filters 12 and the receive filters 14 support LTE bands B8, B12, B20, and B26. Other configurations are the same as those of the third comparative example, and thus the description thereof is omitted.

As illustrated in FIG. 1, the transmit band of LTE band B26 partially overlaps with the receive band of LTE band B20. The transmit band of LTE band B8 partially overlaps with the receive band of LTE band B26. Thus, as indicated by the dashed line arrow in FIG. 19, a signal input from the transmit terminal for LTE band B26 is input to the switch 20a. A part of the transmission signal of LTE band B26 leaks to the receive filter 14 for LTE band B20. When the receive filters 14 for LTE bands B26 and B20 are adjacent to each other, the signal of the receive filter 14 for LTE band B20 (a part of the transmission signal of LTE band B26) is output as the reception signal of LTE band B26. This decreases the receiving sensitivity of LTE band B26. In the same manner, when the receive filters 14 for LTE bands B8 and B26 are adjacent to each other, a part of the transmission signal of LTE band B8 is output as the reception signal of LTE band B8. This decreases the receiving sensitivity of LTE band B8.

Figure 20:
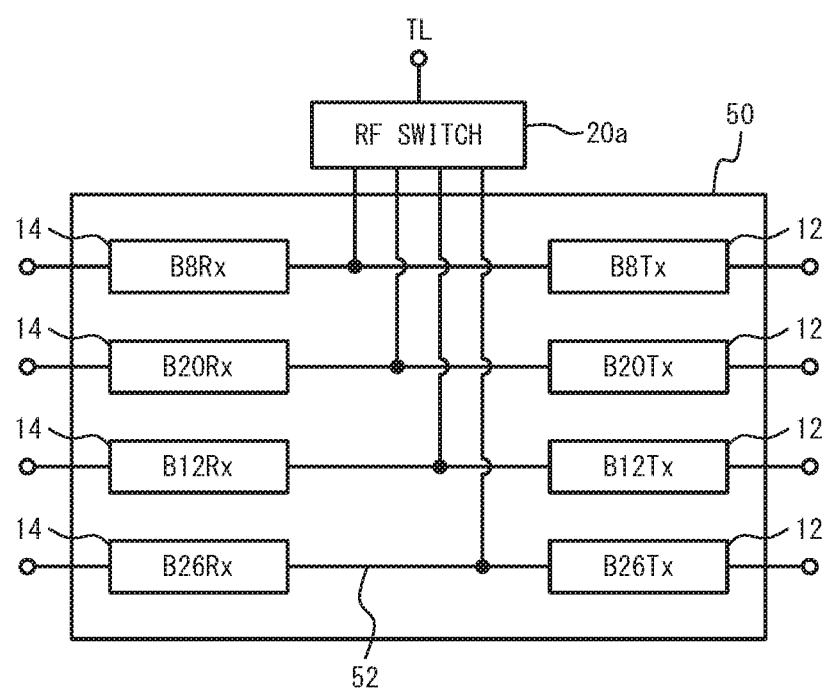
FIG. 20 is a schematic plan view illustrating a module in accordance with the fourth variation of the third embodiment.

FIG. 20 is a schematic plan view illustrating a module in accordance with the fourth variation of the third embodiment. As illustrated in FIG. 20, the transmit filters 12 and the receive filters 14 for LTE bands B8, B12, B20, and B26 are mounted on or embedded in the substrate 50. The multi-throw RF switch 20a is located outside the module. The receive filters 14 are located in the order of LTE bands B8, B20, B12, and B26. Thus, the receive filters 14 for LTE bands B8 and B26 are not adjacent to each other, and the receive filters 14 for LTE bands B20 and B26 are not adjacent to each other. This configuration can reduce the degradation in the receiving sensitivity of LTE bands B26 and B8 described in FIG. 19.

At least one of a switch, an amplifier, and other components may be mounted on or embedded in the substrate 50 in addition to the transmit filters 12 and the receive filters 14. Additionally, the transmit filters 12 and the receive filters 14 may form a multiplexer.

In the third embodiment and the variations thereof, the transmission band of a first band (e.g., LTE band B1) overlaps with at least a part of the receive band of a second band (e.g., LTE band B2), and the receive band of a third band (e.g., LTE band B4) does not overlap with the transmit band of the first band or the transmit band of the second band. In this case, the receive filter for the third band is located between the receive filter for the first band and the receive filter for the second band. This configuration prevents the transmission signal of the first band from passing through the receive filter for the second band and leaking to the receive filter for the first band. Therefore, the degradation in the receiving sensitivity of the first band can be reduced.

In a module including the transmit filters 12 and the receive filters 14 for LTE bands B1 through B4, the receive filters 14 are arranged in the order of LTE bands B1, B3, B4, and B2. This arrangement can reduce the degradation in the receiving sensitivity of LTE bands B1 and B2. Moreover, in a module including the transmit filters 12 and the receive filters 14 for LTE bands B8, B12, B20, and B26, the receive filters 14 are arranged in the order of LTE bands B8, B20, B12, and B26. This arrangement can reduce the degradation in the receiving sensitivity of LTE bands B8 and B26.

As illustrated in FIG. 1, the transmit band of LTE band B25 overlaps with the transmit band of LTE band B2, and the receive band of LTE band B25 overlaps with the receive band of LTE band B2. Thus, instead of the receive filter 14 and the transmit filter 12 for LTE band B2, the receive filter 14 and the transmit filter 12 for LTE band B25 may be used in the third embodiment and the variations thereof. The transmit band of LTE band B5 overlaps with the transmit band of LTE band B26, and the receive band of LTE band B5 overlaps with the receive band of LTE band B26. Thus, instead of the receive filter 14 and the transmit filter 12 for LTE band B26, the receive filter 14 and the transmit filter 12 for LTE band B5 may be used in the fourth variation of the third embodiment. The transmit band of LTE band B17 overlaps with the transmit band of LTE band B12, and the receive band of LTE band B17 overlaps with the receive band of LTE band B12. Thus, instead of the receive filter 14 and the transmit filter 12 for LTE band B12, the receive filter 14 and the transmit filter 12 for LTE band B17 may be used in the fourth variation of the third embodiment.

As with in the third embodiment and the variations thereof, the transmit filter 12 and the receive filter 14 for the same band may be arranged next to each other, or the transmit filters 12 may be arranged in the order different from the arrangement order of the receive filters 14.

The third embodiment and the variations thereof can be applied to the first and second embodiments and the variations thereof.

Fourth Embodiment

Figure 21:
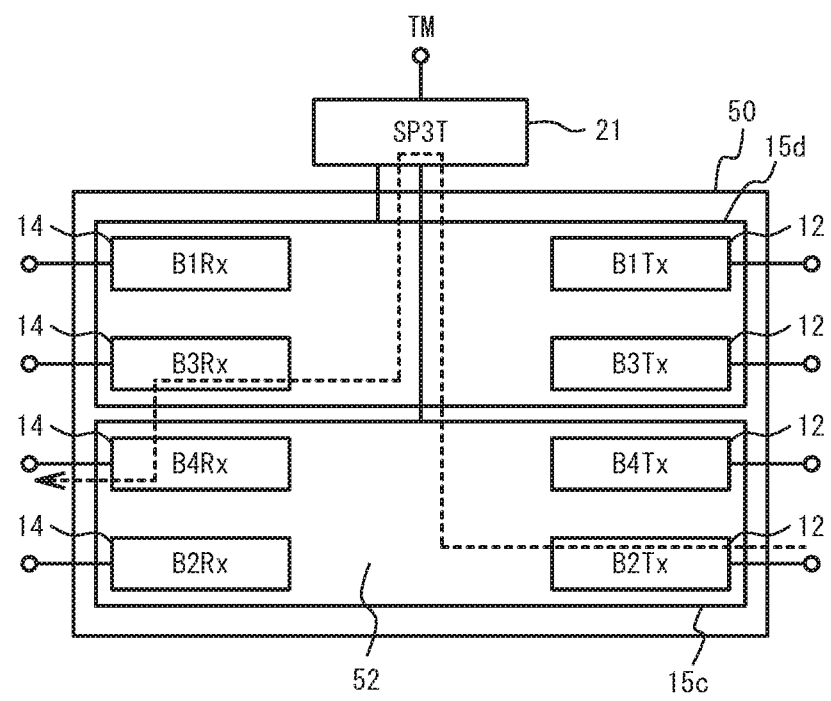
FIG. 21 is a schematic plan view illustrating another module in accordance with the third variation of the third embodiment.

The fourth embodiment performs carrier aggregation. FIG. 21 is a schematic plan view illustrating another module in accordance with the third variation of the third embodiment. As illustrated in FIG. 21, the quadplexers 15c and 15d are mounted on the substrate 50. The receive filters 14 for LTE bands B3 and B4 are located next to each other. The SP3T switch 21, the SP4T switch 26, and the power amplifier 36e are not mounted on the substrate 50. Other configurations are the same as those of the third variation of the third embodiment illustrated in FIG. 16, and thus the description thereof is omitted.

During carrier aggregation, signals of LTE bands B2 and B4 are simultaneously received. At this time, leakage of the signal from the transmit terminal for LTE band B2 to the receive terminals for LTE bands B2 and B4, and leakage of the signal from the transmit terminal for LTE band B4 to the receive terminals for LTE bands B4 and B2 become a problem.

As indicated by the dashed line arrow in FIG. 21, a transmission signal input from the transmit terminal for LTE band B2 reaches the switch 21. Since the transmit band of LTE band B2 partially overlaps with the receive band of LTE band B3, a part of the transmission signal of LTE band B2 leaks to the receive filter 14 for LTE band B3 in the switch 21. When the receive filters 14 for LTE bands B3 and B4 are adjacent to each other, the coupling between LTE bands B3 and B4 is large. Thus, the signal of the receive filter 14 for LTE band B3 (a part of the transmission signal of LTE band B2) is output as the reception signal of LTE band B4. This decreases the receiving sensitivity of LTE band B4.

Figure 22:
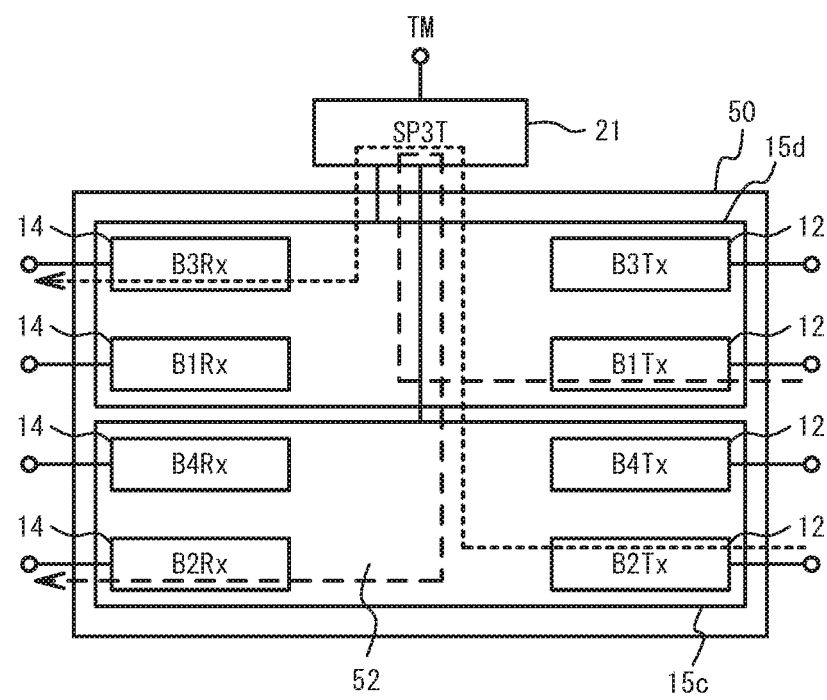
FIG. 22 is a schematic plan view illustrating a module in accordance with the fourth embodiment.

FIG. 22 is a schematic plan view illustrating a module in accordance with the fourth embodiment. As illustrated in FIG. 22, the receive filters 14 are arranged so that the receive filters 14 for LTE bands B1 and B4 are adjacent to each other. Other configurations are the same as those of FIG. 21, and thus the description thereof is omitted. As indicated by the dashed line arrow in FIG. 22, even when a part of the transmission signal of LTE band B2 leaks to the receive filter 14 for LTE band B3, the receive filter 14 for LTE band B3 and the receive filters 14 for LTE bands B2 and B4 are not adjacent to each other. Thus, a part of the transmission signal of LTE band B2 can be prevented from leaking to the receive terminals for LTE bands B2 and B4. Accordingly, the degradation in the receiving sensitivity of LTE bands B2 and B4 can be reduced.

Signals of LTE bands B1 and B3 are simultaneously received during carrier aggregation. Thus, it is preferable to prevent leakage of the signal from the transmit terminal for LTE band B1 to the receive terminals for LTE bands B1 and B3 and leakage of the signal from the transmit terminal for LTE band B3 to the receive terminals for LTE bands B3 and B1. The transmit band of LTE band B1 partially overlaps with the receive band of LTE band B2. Thus, as indicated by the long interval dashed line arrow, a part of the transmission signal of LTE band B1 leaks to the receive filter 14 for LTE band B2 through the switch 21. However, the receive filter 14 for LTE band B2 and the receive filters 14 for LTE bands B3 and B1 are not adjacent to each other. Thus, a part of the transmission signal of LTE band B1 can be prevented from leaking to the receive terminals for LTE bands B1 and B3. Accordingly, the degradation in the receiving sensitivity of LTE bands B1 and B3 can be reduced.

Figure 23:
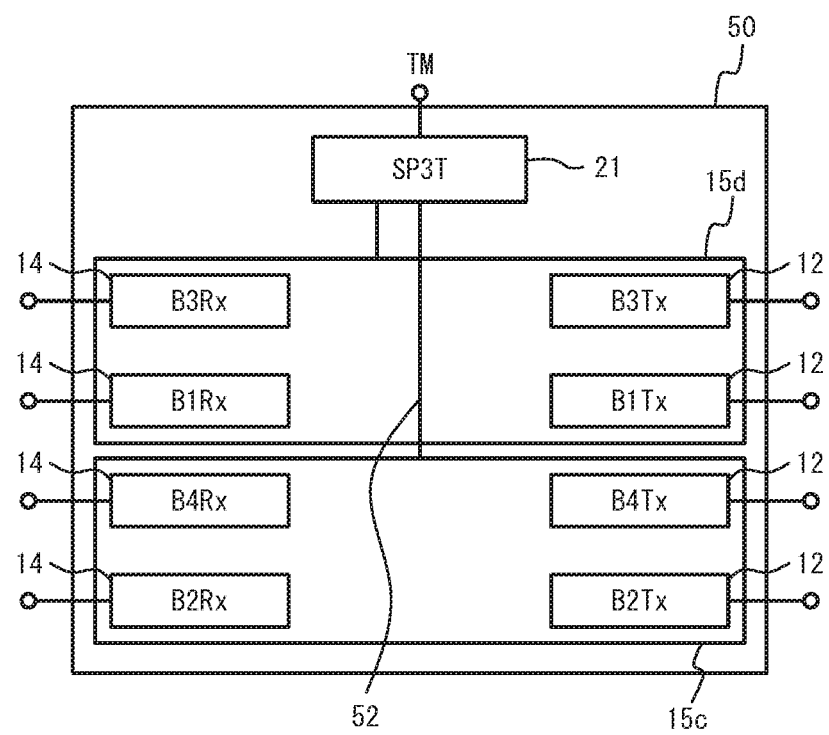
FIG. 23 is a schematic plan view illustrating a module in accordance with a first variation of the fourth embodiment.

FIG. 23 is a schematic plan view illustrating a module in accordance with a first variation of the fourth embodiment. As illustrated in FIG. 23, the switch 21 is mounted on or embedded in the substrate 50. Other configurations are the same as those of the fourth embodiment, and thus the description thereof is omitted.

Figure 24:
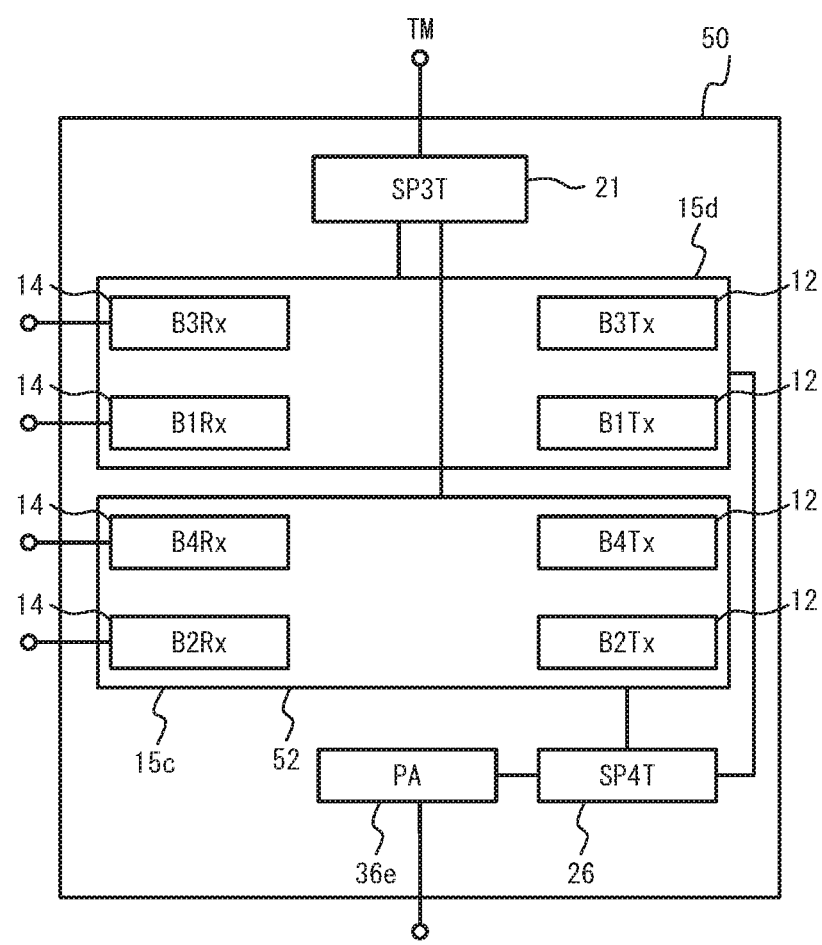
FIG. 24 is a schematic plan view illustrating a module in accordance with a second variation of the fourth embodiment.

FIG. 24 is a schematic plan view illustrating a module in accordance with a second variation of the fourth embodiment. As illustrated in FIG. 24, the switch 26 and the power amplifier 36e are mounted on or embedded in the substrate 50. Other configurations are the same as those of the first variation of the fourth embodiment, and thus the description thereof is omitted.

As illustrated in FIG. 23 and FIG. 24, at least one of the switches 21, 26, and the power amplifier 36e may be mounted on or embedded in the substrate 50 in addition to the transmit filters 12 and the receive filters 14. Alternatively, other components may be mounted on or embedded in the substrate 50.

Figure 25:
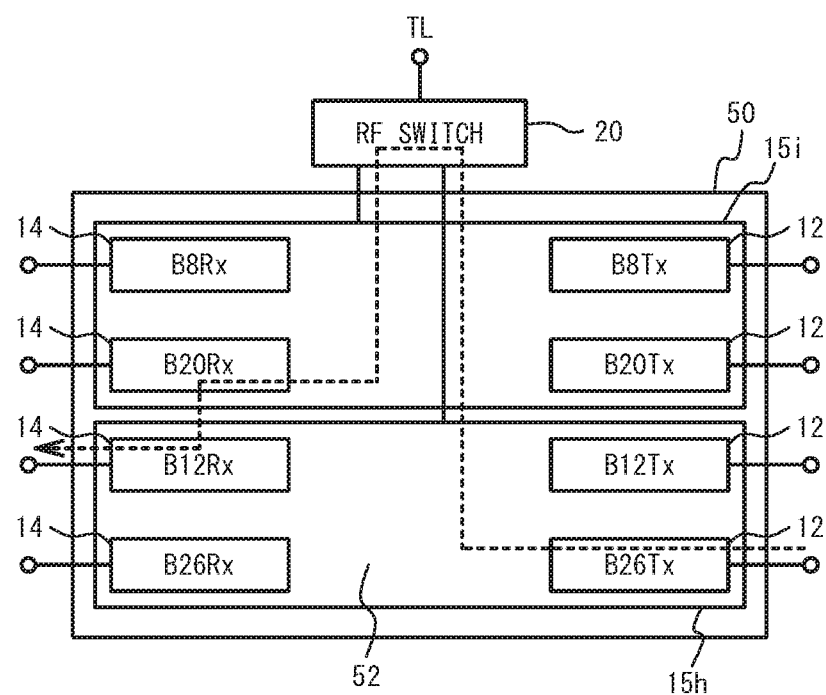
FIG. 25 is a schematic plan view illustrating another module in accordance with the fourth variation of the third embodiment.

FIG. 25 is a schematic plan view illustrating another module in accordance with the fourth variation of the third embodiment. As illustrated in FIG. 25, the quadplexers 15h and 15i are mounted on the substrate 50. The transmit filters 12 and the receive filters 14 for LTE bands B8 and B20 are included in the quadplexer 15i. The transmit filters 12 and the receive filters 14 for LTE bands B12 and B26 are included in the quadplexer 15h. Other configurations are the same as those of FIG. 20, and thus the description thereof is omitted.

Signals of LTE bands B12 and B26 are simultaneously received during carrier aggregation. Thus, it is preferable to prevent leakage of the signal from the transmit terminal for LTE band B12 to the receive terminals for LTE bands B12 and B26 and leakage of the signal from the transmit terminal for LTE band B26 to the receive terminals for LTE bands B12 and B26. The transmit band of LTE band B26 partially overlaps with the receive band of LTE band B20. Thus, as indicated by the dashed line arrow, a part of the transmission signal of LTE band B26 leaks to the receive filter 14 for LTE band B20 through the switch 20. The receive filters 14 for LTE bands B12 and B20 are adjacent to each other. Thus, a part of the transmission signal of LTE band B26 leaks to the receive terminal for LTE band B12. Accordingly, the receiving sensitivity of LTE band B12 decreases.

Figure 26:
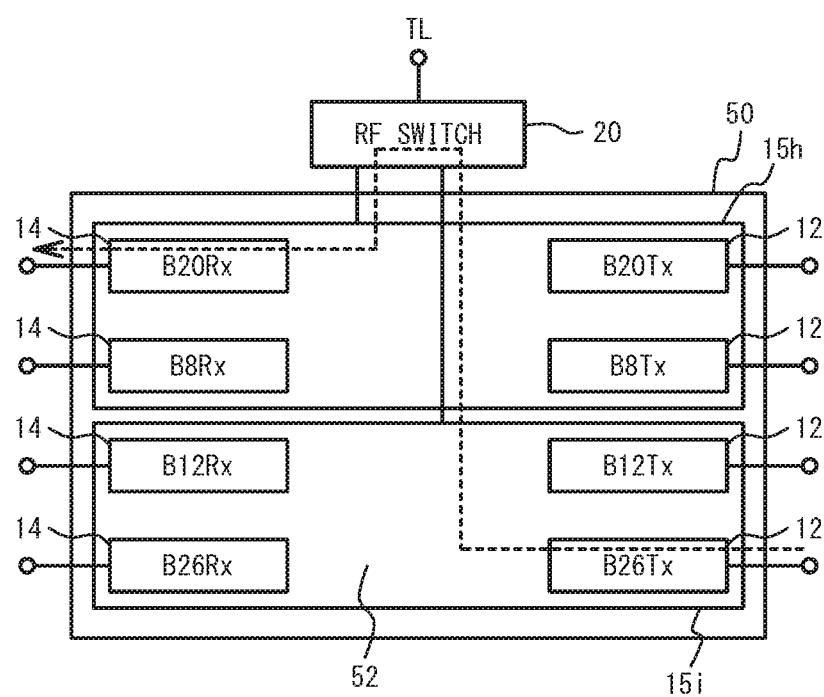
FIG. 26 is a schematic plan view illustrating a module in accordance with a third variation of the fourth embodiment.

FIG. 26 is a schematic plan view illustrating a module in accordance with a third variation of the fourth embodiment. As illustrated in FIG. 26, the receive filters 14 are arranged so that the receive filters 14 for LTE bands B8 and B12 are adjacent to each other. Other configurations are the same as those of FIG. 25, and thus the description thereof is omitted. As indicated by the dashed line arrow in FIG. 26, even when a part of the transmission signal of LTE band B26 leaks to the receive filter 14 for LTE band B20, the receive filter 14 for LTE band B20 and the receive filters 14 for LTE bands B12 and B26 are not adjacent to each other. Thus, a part of the transmission signal of LTE band B26 can be prevented from leaking to the receive terminals for LTE bands B12 and B26. Accordingly, the degradation in the receiving sensitivity of LTE bands B12 and B26 can be reduced.

In the fourth embodiment and the variations thereof, the reception signal of a first band (e.g., LTE band B1) and the reception signal of a second band (e.g., LTE band B3) are simultaneously received. The receive band of a third band (e.g., LTE band B2) overlaps with at least a part of the transmit band of the first band. The receive band of a fourth band (e.g., LTE band B4) does not overlap with the transmit band of the first band. In this case, the receive filter for the fourth band is located between the receive filters for the first band and the second band and the receive filter for the third band. This configuration can prevent the transmission signal of the first band from passing through the receive filter for the third band and leaking to the receive filters for the first band and the second band. Accordingly, the degradation in the receiving sensitivity of the first band and the second band can be reduced.

In addition, it becomes a problem that a part of the transmission signal of the second band leaks to the receive filter 14 for the fourth band, and then leaks from the receive filter 14 for the fourth band to the receive filter 14 for the first or second band. Thus, it is preferable that the receive band of the fourth band does not overlap with the transmit band of the second band.

To prevent leakage of the signal between different bands, it is preferable to arrange the receive filters 14 in the order of LTE bands B3, B1, B4, and B2 in a module including the transmit filters 12 and the receive filters 14 for LTE bands B1 through B4. Moreover, it is preferable to arrange the receive filters 14 in the order of LTE bands B20, B8, B12, and B26 in a module including the transmit filters 12 and the receive filters 14 for LTE bands B8, B12, B20, and B26.

As illustrated in FIG. 1, the transmit band of LTE band B25 overlaps with the transmit band of LTE band B2, and the receive band of LTE band B25 overlaps with the receive band of LTE band B2. Thus, instead of the receive filter 14 and the transmit filter 12 for LTE band B2, the receive filter 14 and the transmit filter 12 for LTE band B25 may be used in the fourth embodiment and the variations thereof. The transmit band of LTE band B5 overlaps with the transmit band of LTE band B26, and the receive band of LTE band B5 overlaps with the receive band of LTE band B26. Thus, instead of the receive filter 14 and the transmit filter 12 for LTE band B26, the receive filter 14 and the transmit filter 12 for LTE band B5 may be used in the fourth embodiment and the variations thereof. The transmit band of LTE band B17 overlaps with the transmit band of LTE band B12, and the receive band of LTE band B17 overlaps with the receive band of LTE band B12. Thus, instead of the receive filter 14 and the transmit filter 12 for LTE band B12, the receive filter 14 and the transmit filter 12 for LTE band B17 may be used in the fourth embodiment and the variations thereof.

In the fourth embodiment and the variations thereof, the transmit filter 12 and the receive filter 14 are included in a quadplexer, but the transmit filter 12 and the receive filter 14 may be individually mounted on the substrate 50. Additionally, a switch, a power amplifier, and the like may be mounted on the substrate 50.

Fifth Embodiment

Figure 27A:
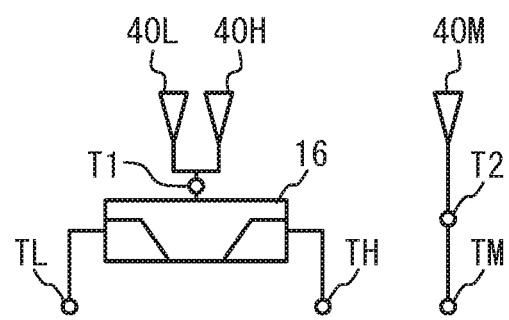
FIG. 27A is a block diagram around an antenna of a communication device in accordance with the fifth embodiment.
Figure 27B:
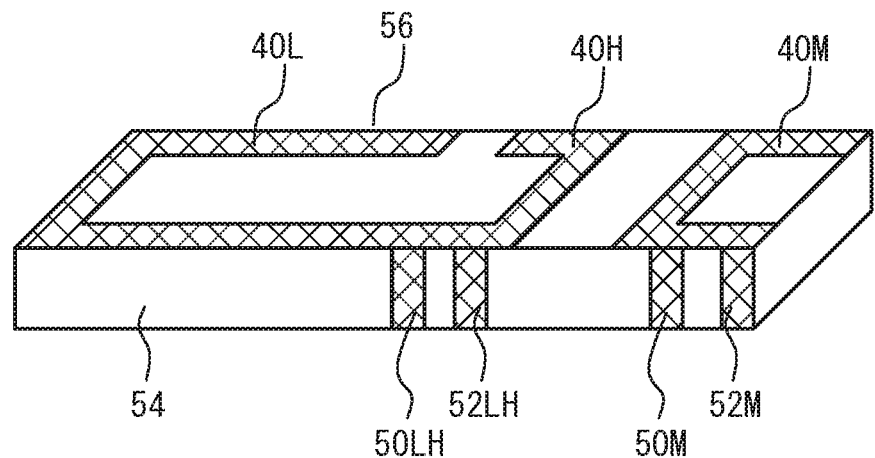
FIG. 27B is a perspective view of the antenna.

FIG. 27A is a block diagram around an antenna of a communication device in accordance with the fifth embodiment, and FIG. 27B is a perspective view of the antenna. As illustrated in FIG. 27A, the terminal T1 is coupled to the low band antenna 40L and the high band antenna 40H. The terminal T2 is coupled to the middle band antenna 40M.

As illustrated in FIG. 27B, a metal film 56 is formed on a dielectric substance 54. The metal film includes signal terminals 50LH and 50M, ground terminals 52LH and 52M, the low band antenna 40L, the high band antenna 40H, and the middle band antenna 40M. The antennas 40L, 40H, and 40M are antenna radiators. The low band antenna 40L is coupled to the high band antenna 40H on the dielectric substance 54. The signal terminal 50LH and the ground terminal 52LH are coupled to a region where the low band antenna 40L is coupled to the high band antenna 40H. The middle band antenna 40M electrically separates from the low band antenna 40L and the high band antenna 40H. The signal terminal 50M and the ground terminal 52M are coupled to the middle band antenna 40M. Other configurations are the same as those of the first embodiment, and thus the description thereof is omitted.

In the fifth embodiment, the low band antenna 40L and the high band antenna 40H share the signal terminal 50LH and the ground terminal 52LH. This configuration enables to reduce the size and the cost.

Figure 28A:
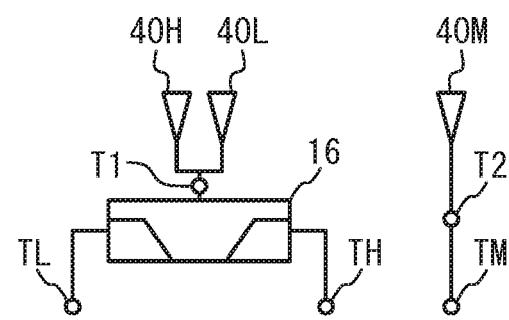
FIG. 28A is a block diagram around an antenna of a communication device in accordance with a first variation of the fifth embodiment.
Figure 28B:
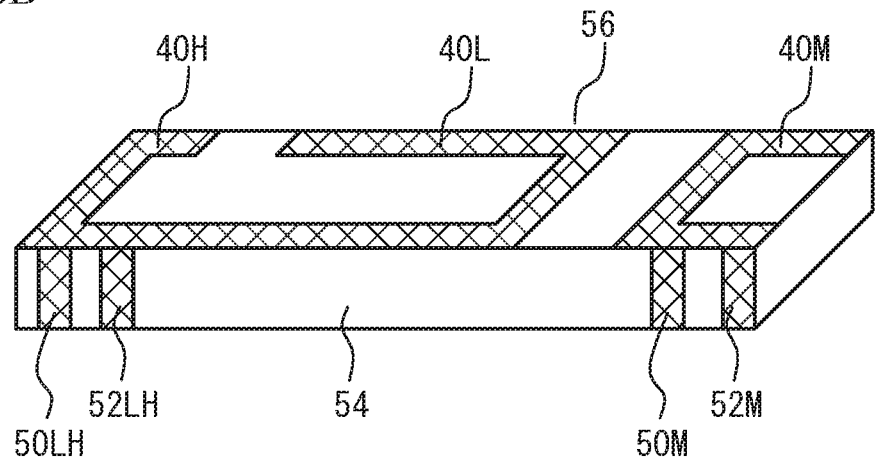
FIG. 28B is a perspective view of the antenna.

FIG. 28A is a block diagram around an antenna of a communication device in accordance with a first variation of the fifth embodiment, and FIG. 28B is a perspective view of the antenna. As illustrated in FIG. 28A and FIG. 28B, the low band antenna 40L is located between the high band antenna 40H and the middle band antenna 40M. Other configurations are the same as those of the fifth embodiment, and thus the description thereof is omitted.

When the high band antenna 40H is located between the low band antenna 40L and the middle band antenna 40M like in the fifth embodiment, the isolation between the high band antenna 40H and the middle band antenna 40M deteriorates.

In the first variation of the fifth embodiment, the low band antenna 40L is located between the high band antenna 40H and the middle band antenna 40M. This configuration enables to improve the isolation between the high band antenna 40H and the middle band antenna 40M. The low band antenna 40L is adjacent to the middle band antenna 40M. However, as illustrated in FIG. 1, the frequency interval between the low band and the middle band is wider than the frequency interval between the middle band and the high band. Thus, the isolation between the low band antenna 40L and the middle band antenna 40M little deteriorates. Additionally, the signal terminal can be shared by the high band and the low band, and thus the cost and the size can be reduced.

The fifth embodiment and the variation thereof can be applied to the first through fourth embodiments and the variations thereof.

Sixth Embodiment

Figure 29A:
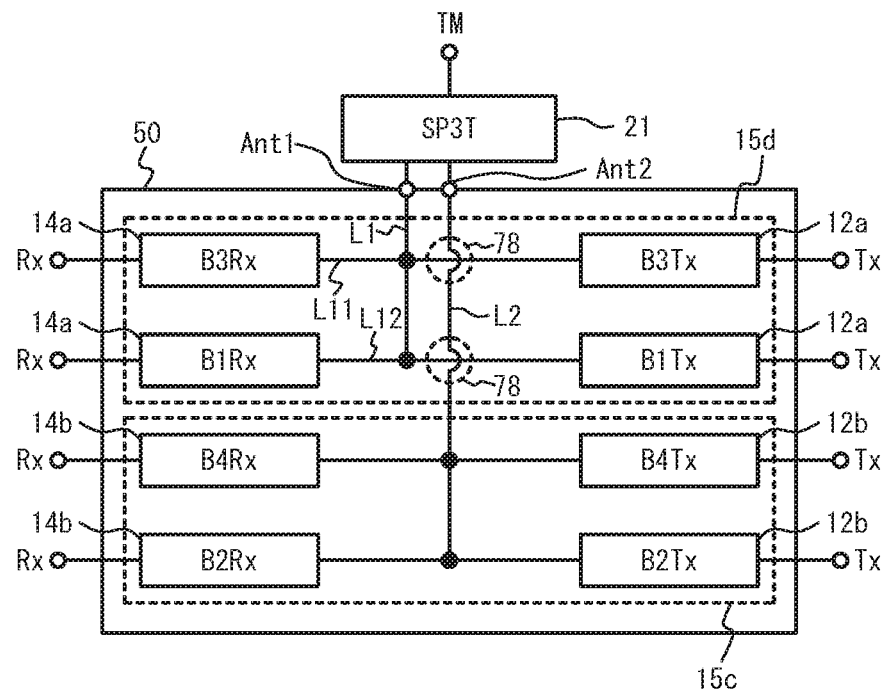
FIG. 29A is a plan view of the module in accordance with the fourth embodiment.
Figure 29B:
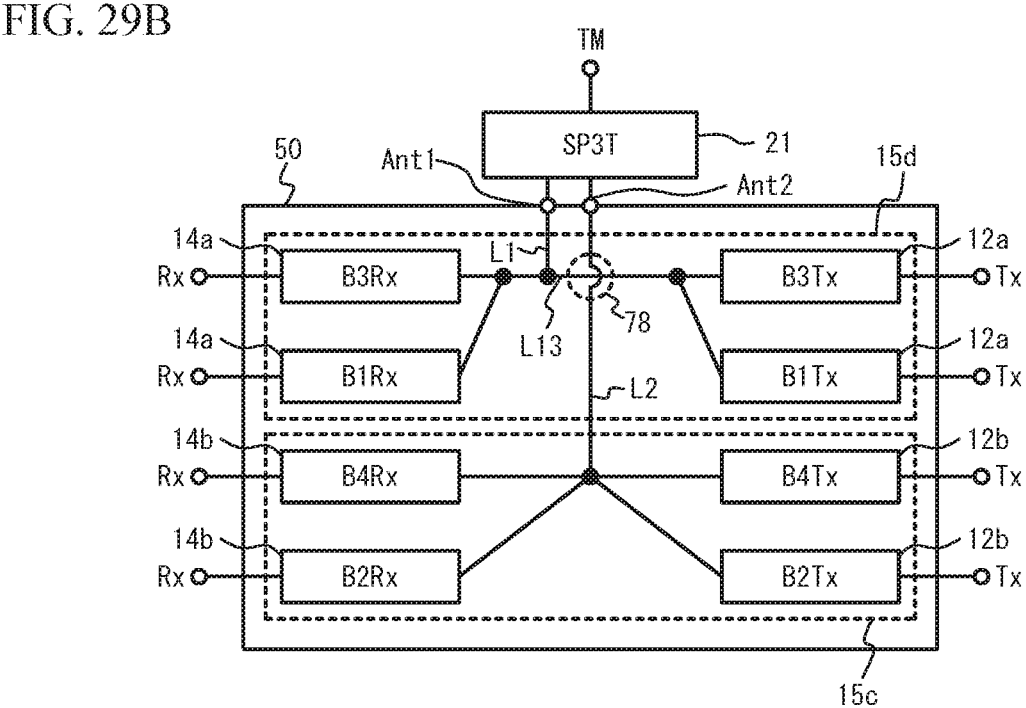
FIG. 29B is a plan view of a module in accordance with a sixth embodiment.

A sixth embodiment is an exemplary module including common terminals as with in the third embodiment, the fourth embodiment, and the variations thereof. FIG. 29A is a plan view of the module in accordance with the fourth embodiment, and FIG. 29B is a plan view of a module in accordance with the sixth embodiment. As illustrated in FIG. 29A, in the module illustrated in FIG. 22 of the fourth embodiment, the quadplexer 15d includes receive filters 14a and transmit filters 12a (first filters), and the quadplexer 15c includes receive filters 14b and transmit filters 12b (second filters). Each of the receive filters 14a is connected between a common terminal Ant1 (a first common terminal) and a receive terminal Rx (a first terminal). Each of the transmit filters 12a is connected between the common terminal Ant1 and a transmit terminal Tx (a second terminal). Each of the receive filters 14b is connected between a common terminal Ant2 (a second common terminal) and the receive terminal Rx. Each of the transmit filters 12b is connected between the common terminal Ant2 and the transmit terminal Tx.

A wiring line L1 commonly connects the receive filters 14a and the transmit filters 12a to the common terminal Ant1. A wiring line L2 commonly connects the receive filters 14b and the transmit filters 12b to the common terminal Ant2. The wiring lines L1 and L2 are formed in the substrate 50.

The wiring line L1 includes a wiring line L11 that interconnects the receive filter 14a and the transmit filter 12a for LTE band B3, and a wiring line L12 that interconnects the receive filter 14a and the transmit filter 12a for LTE band B1. Thus, the wiring line L2 intersects with two wiring lines L11 and L12 of the wiring line L1 in intersect regions 78. A high-frequency signal is reflected in the intersect region 78 of the wiring lines L1 and L2. This deteriorates high-frequency characteristics.

As illustrated in FIG. 29B, in the sixth embodiment, the receive filters 14a and the transmit filters 12a are interconnected by a single wiring line L13 of the wiring line L1 in the quadplexer 15d. Other configurations are the same as those of the fourth embodiment illustrated in FIG. 29A, and thus the description thereof is omitted. Thus, the number of the intersect regions 78 at which the wiring lines L1 and L2 intersect is one. This reduces the deterioration of high-frequency characteristics.

Figure 30:
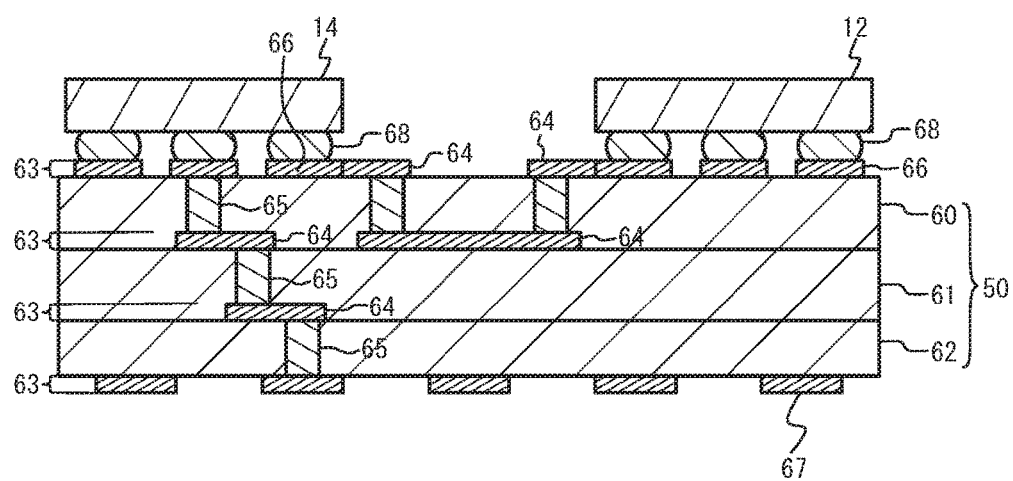
FIG. 30 is a cross-sectional view of the module in accordance with the sixth embodiment.

A description will next be given of an example of the arrangement of wiring lines in the sixth embodiment. FIG. 30 is a cross-sectional view of the module of the sixth embodiment. As illustrated in FIG. 30, the substrate 50 includes stacked insulating layers 60 through 62. The insulating layers 60 through 62 are, for example, resin layers. Metal layers 63 are formed on the upper surfaces of the insulating layers 60 through 62 and the lower surface of the insulating layer 62. The metal layer 63 is, for example, a copper layer or a gold layer. Wiring lines 64, pads 66, and foot pads 67 are formed of the metal layers 63. Vias 65 piercing through the insulating layers 60 through 62 are formed. A metal such as copper is embedded in the via 65. The transmit filter 12 and the receive filter 14 are mounted on the pads 66 through solder 68. The transmit filter 12 and the receive filter 14 are integrated in a chip or a package in which filters are formed.

Figure 31A:
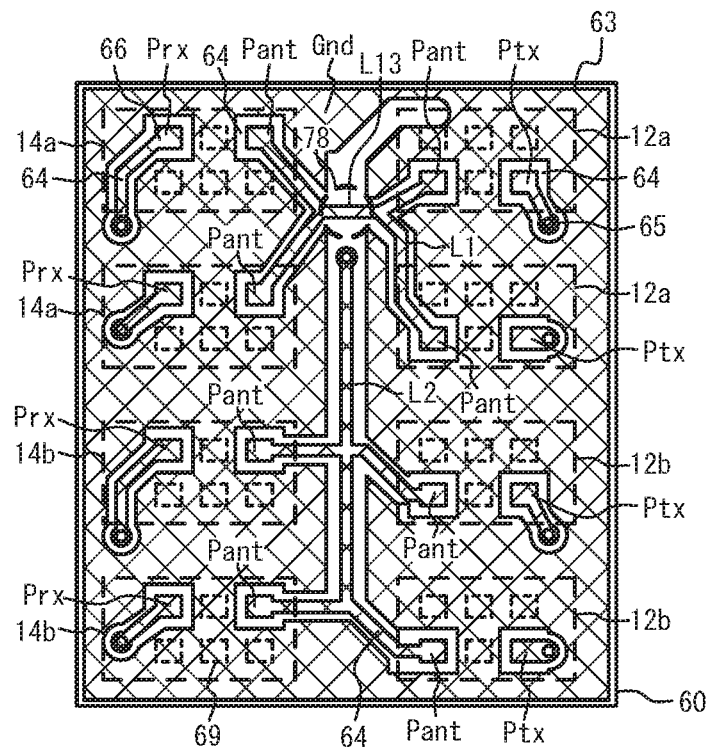
FIG. 31A and FIG. 31B are plan views of insulating layers in the sixth embodiment (No. 1)
Figure 31B:
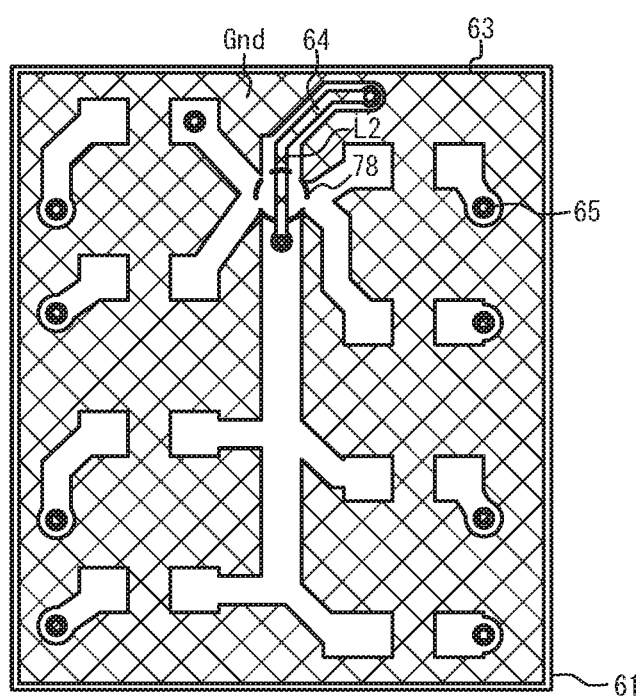
Figure 32A:
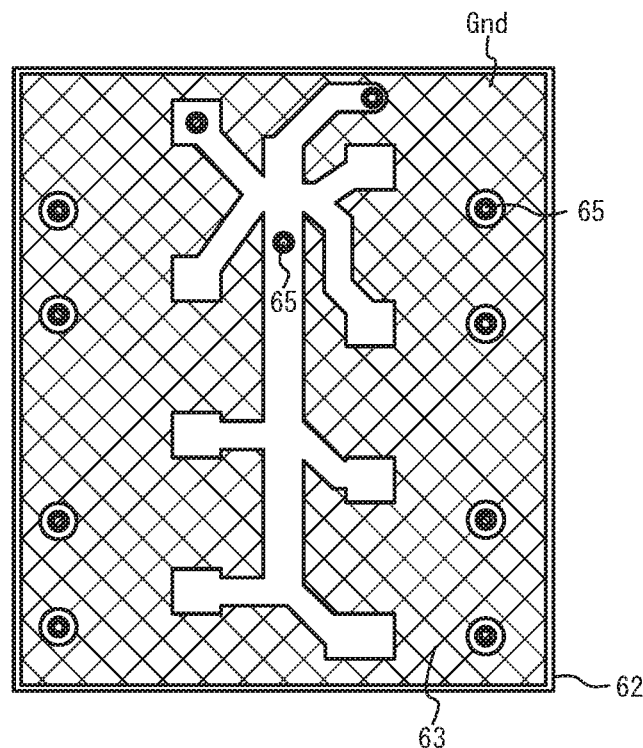
FIG. 32A and FIG. 32B are plan views of insulating layers in the sixth embodiment (No. 2)
Figure 32B:
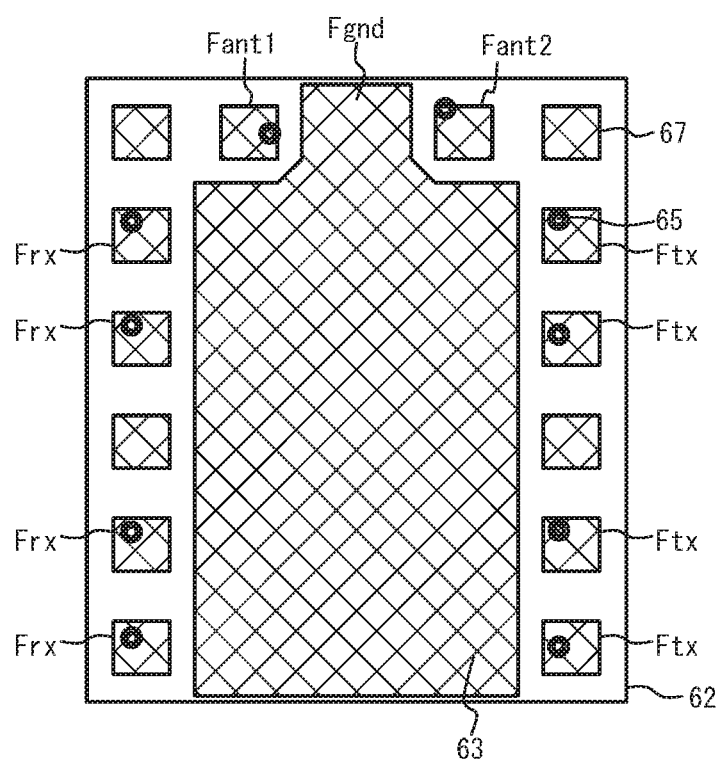

FIG. 31A through FIG. 32B are plan views of the insulating layers in the sixth embodiment. FIG. 31A through FIG. 32A are plan views of the upper surfaces of the insulating layers 60 through 62, respectively, and FIG. 32B is a transparent view of the lower surface of the insulating layer 62 viewed from above. In FIG. 31A, the filters 12a, 12b, 14a, and 14b are illustrated by dashed lines.

As illustrated in FIG. 31A, the metal layer 63 is formed on the upper surface of the insulating layer 60, and the vias 65 piercing through the insulating layer 60 are formed. The receive filters 14a and the transmit filters 12a in the quadplexer 15d and the receive filters 14b and the transmit filters 12b in the quadplexer 15c are mounted on the insulating layer 60. The metal layer 63 includes the wiring lines 64, and the pads 66. The wiring lines 64 include the wiring lines L1, L2, and a ground pattern Gnd. The pads 66 include receive pads Prx, transmit pads Ptx, and common pads Pant.

Each of the receive filters 14a and 14b is coupled to the corresponding receive pad Prx and to the corresponding common pad Pant by solder 68. Each of the transmit filters 12a and 12b is coupled to the corresponding transmit pad Ptx and the corresponding common pad Pant by solder 68. The ground of each of the filters 12a, 12b, 14a, and 14b is coupled to a region 69 in the ground pattern Gnd by solder 68. The wiring line L1 commonly connects the common pads Pant to which the receive filters 14a and the transmit filters 12a are connected. The wiring line L2 commonly connects the common pads Pant to which the receive filters 14b and the transmit filters 12b are connected. The wiring line L2 is not formed in the intersect region 78 where the wiring lines L1 and L2 intersect. The ground pattern Gnd is formed to surround the wiring lines 64 and the pads 66. The vias 65 each piercing through the insulating layer 60 and connecting to the wiring line 64 are formed.

As illustrated in FIG. 31B, the metal layer 63 is formed on the upper surface of the insulating layer 61. The metal layer includes the wiring lines 64. The wiring lines 64 include a part of the wiring line L2 in the intersect region 78 and the ground pattern Gnd. The vias 65 each piercing through the insulating layer 61 and connecting to the wiring line 64 are formed. As illustrated in FIG. 32A, the metal layer 63 is formed on the upper surface of the insulating layer 62. The vias 65 each piercing through the insulating layer 62 and connecting to the wiring line 64 are formed.

As illustrated in FIG. 32B, the metal layer 63 is formed on the lower surface of the insulating layer 62. The metal layer 63 includes the foot pads 67. The foot pads 67 include receive foot pads Frx, transmit foot pads Ftx, common foot pads Fant1, Fant2, and a ground foot pad Fgnd. The receive foot pads Frx, the transmit foot pads Ftx, and the common foot pads Fant1 and Fant2 correspond to the receive terminals Rx, the transmit terminals Tx, and the common terminals Ant1 and Ant2 in FIG. 29B, respectively. The vias 65 each piercing through the insulating layer 62 and connecting to the foot pad 67 are formed.

As illustrated in FIG. 31A through FIG. 32B, the wiring line L1 is electrically connected to the common foot pad Fant1 through the wiring lines 64 and the vias 65 of the insulating layers 60 through 62. The wiring line L2 is electrically connected to the common foot pad Fant2 through the wiring lines 64 and the vias 65 of the insulating layers 60 through 62. The receive pads Prx are electrically connected to the receive foot pads Frx through the wiring lines 64 and the vias 65, and the transmit pads Ptx are electrically coupled to the transmit foot pads Ftx through the wiring lines 64 and the vias 65. The ground patterns Gnd and the ground foot pad Fgnd formed on the upper surfaces of the insulating layers 60 through 62 are electrically interconnected through the vias 65, but FIG. 31A through FIG. 32B do not illustrate the ground vias 65.

Figure 33:
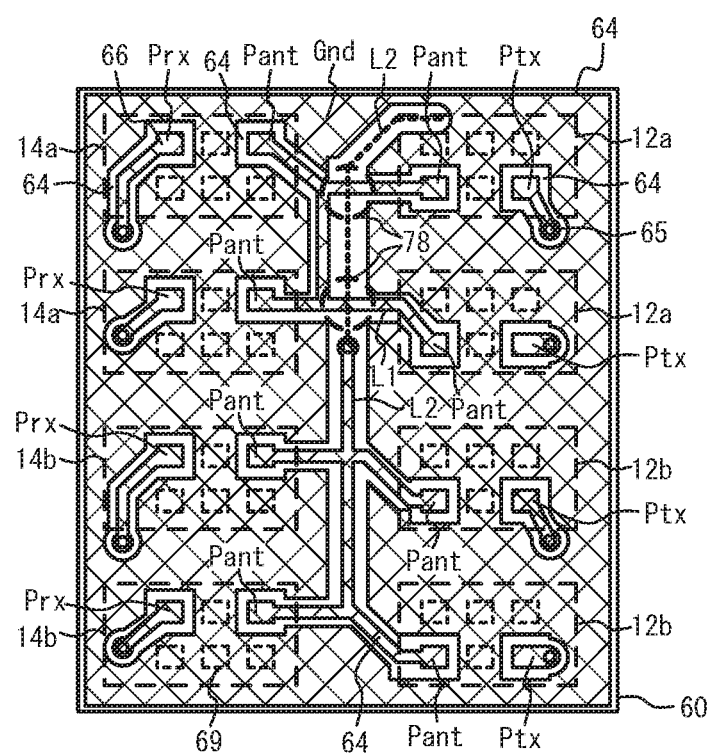
FIG. 33 is a plan view of an insulating layer 60 in the fourth embodiment.

FIG. 33 is a plan view of the insulating layer 60 in the fourth embodiment. As illustrated in FIG. 33, in the fourth embodiment, the wiring lines L1 and L2 intersect in two intersect regions 78. Other configurations are the same as those of FIG. 30 through FIG. 32B, and thus the description thereof is omitted.

In the sixth embodiment, as illustrated in FIG. 29B through FIG. 32B, the receive filter 14a and the transmit filter 12a have different passbands, and the receive filter 14b and the transmit filter 12b have different passbands. That is to say, the passband of the receive filter 14a does not overlap with the passband of the transmit filter 12a, and the passband of the receive filter 14b does not overlap with the passband of the transmit filter 12b. The common terminals Ant1 and Ant2 are located at the same side as the receive filter 14a and the transmit filter 12a. The receive filter 14b and the transmit filter 12b are opposite the common terminals Ant1 and Ant2 across the receive filter 14a and the transmit filter 12a. In such an arrangement, the wiring line L2 intersects the wiring line L1 in a single region. This configuration improves high-frequency characteristics compared to a case where the wiring line L2 intersects the wiring line L1 in two or more regions as with in the fourth embodiment of FIG. 29A through FIG. 33.

The sixth embodiment describes a case where each of the wiring line L1 and the wiring line L2 are coupled to four filters. The wiring line L1 is required to connect at least three first filters to the common terminal Ant1. The wiring line L2 is required to connect at least one second filter to the common terminal Ant2. When the number of the receive filters 14a and the number of the transmit filters 12a are at least three, the number of the intersect regions 78 where the wiring line L1 intersects the wiring line L2 is two or more, and thus high-frequency characteristics may deteriorate. The sixth embodiment configures the number of the intersect regions 78 to be one, thereby reducing the deterioration of high-frequency characteristics.

Additionally, the receive filter 14a and the transmit filter 12a are located at both sides of the wiring line L1. In this case, the number of the intersect regions 78 easily becomes two or more, and high-frequency characteristics may deteriorate. The sixth embodiment configures the number of the intersect regions 78 to be one, thereby reducing the deterioration of high-frequency characteristics. Moreover, when the receive filter 14a and the transmit filter 12a are located at both sides of the wiring line L1, the ground pattern Gnd and the ground via connected to the receive filter 14a can be separated from the ground pattern Gnd and the ground via connected to the transmit filter 12a. This decreases the impedance shared by the receive filter 14a and the transmit filter 12a, thereby reducing the interference between the reception signal and the transmission signal.

Furthermore, the wiring line L2 connects at least three second filters to the common terminal Ant2. In this case, even when the second filter is located closer to the common terminals Ant1 and Ant2 than the first filter, the number of the intersect regions 78 easily becomes two or more, and high-frequency characteristics may deteriorate. The sixth embodiment configures the number of the intersect regions 78 to be one, thereby reducing the deterioration of high-frequency characteristics.

In the sixth embodiment, the first filter includes the receive filter 14a and the transmit filter 12a, and the second filter includes the receive filter 14b and the transmit filter 12b. However, the first filter may include only one of the receive filter and the transmit filter, and the second filter may include only the other of the receive filter and the transmit filter.

As described in the sixth embodiment, the first filter includes the transmit filter 12a (a first transmit filter) and the receive filter 14a (a first receive filter) for LTE band B3 (a first band), and the transmit filter 12a (a second transmit filter) and the receive filter 14a (a second receive filter) for LTE band B1 (a second band). The second filter includes the transmit filter 12b (a third transmit filter) and the receive filter 14b (a third receive filter) for LTE band B4 (a third band), and the transmit filter 12b (a fourth transmit filter) and the receive filter 14b (a fourth receive filter) for LTE band B2 (a fourth band). As described above, when the quadplexers 15d and 15c for different bands are mounted on the substrate 50, the wiring becomes complicated, and high-frequency characteristics easily deteriorate. The deterioration of high-frequency characteristics can be reduced by configuring the number of the intersect regions 78 to be one. LTE bands B3, B1, B4, and B2 are used as an example, but the above discussion is applicable to other bands.

In the intersect region 78, the wiring line L1 and the wiring line L2 are formed on the surfaces of the different insulating layers 60 and 61 among the insulating layers 60 through 62. Thus, the wiring line L1 can easily intersect with the wiring line L2. However, the distance between the wiring lines L1 and L2 in the intersect region 78 decreases, and high-frequency signals easily interfere. Therefore, the deterioration of high-frequency characteristics can be reduce by configuring the number of the intersect regions 78 to be one.

Figure 34A:
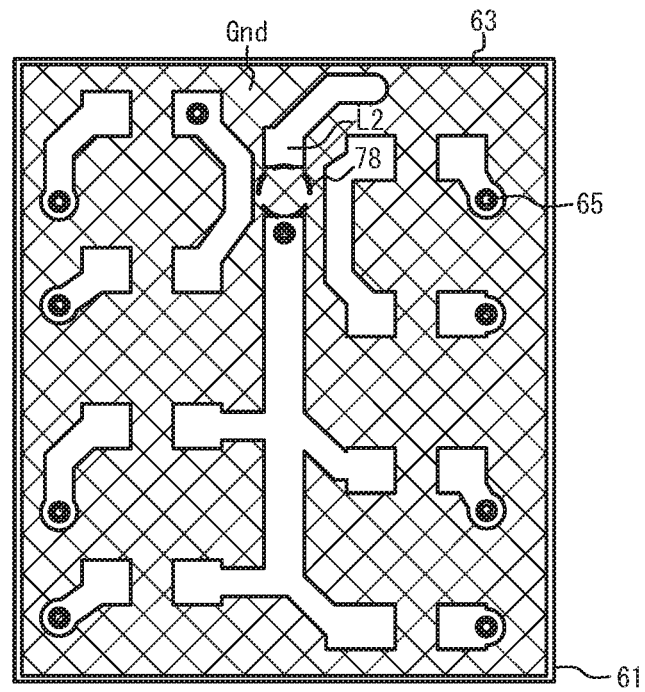
FIG. 34A and FIG. 34B are plan views of insulating layers in a first variation of the sixth embodiment.
Figure 34B:
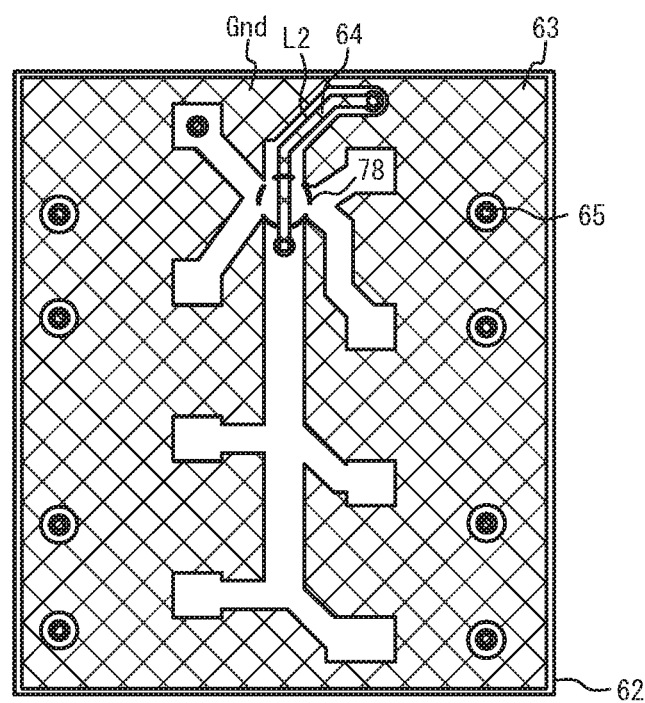

FIG. 34A and FIG. 34B are plan views of the insulating layers in a first variation of the sixth embodiment. FIG. 34A and FIG. 34B are plan views of the insulating layers 61 and 62, respectively. The upper surface of the insulating layer 60 and the lower surface of the insulating layer 62 are the same as those in the sixth embodiment illustrated in FIG. 31A and FIG. 32B.

As illustrated in FIG. 34A, the wiring line L2 is not formed in the intersect region 78 of the insulating layer 61. The ground pattern Gnd is formed in the intersect region 78. As illustrated in FIG. 34B, the wiring line L2 including the intersect region 78 is formed. Other configurations are the same as those of the sixth embodiment, and thus the description thereof is omitted.

In the first variation of the sixth embodiment, the ground pattern Gnd is located between the wiring line L1 and the wiring line L2 in the intersect region 78 where the wiring line L1 intersects the wiring ling L2. This configuration reduces the interference of high-frequency signals in the intersect region 78, and improves high-frequency characteristics. In the intersect region 78, two or more insulating layers may be located between the wiring lines L1 and L2. In the intersect region 78, two or more ground patterns Gnd may be located between the wiring lines L1 and L2.

The module of the sixth embodiment and the variation thereof can be applied to the first through fifth embodiments and the variations thereof.

Although the embodiments of the present invention have been described in detail, it is to be understood that the various change, substitutions, and alterations could be made hereto without departing from the spirit and scope of the invention.

What is claimed is:

1. A module comprising:
   a substrate;
   a first transmit filter that is mounted on the substrate or is embedded in the substrate and that passes a transmission signal of a first band, the first band including a first transmit band and a first receive band, the first transmit band and the first receive band not overlapping with each other;
   a first receive filter that is mounted on the substrate or is embedded in the substrate and that passes a reception signal of the first band;

a second transmit filter that is mounted on the substrate or is embedded in the substrate and that passes a transmission signal of a second band, the second band including a second transmit band and a second receive band, the second transmit band and the second receive band not overlapping with each other;
a second receive filter that is mounted on the substrate or is embedded in the substrate and that passes a reception signal of the second band;
a third transmit filter that is mounted on the substrate or is embedded in the substrate and that passes a transmission signal of a third band, the third band including a third transmit band and a third receive band, the third transmit band and the third receive band not overlapping with each other; and
a third receive filter that is mounted on the substrate or is embedded in the substrate and that passes a reception signal of the third band, wherein:
at least a part of the first transmit band overlaps with at least a part of the second receive band,
the third receive band does not overlap with the first transmit band or the second transmit band,
the third receive filter is located between the first receive filter and the second receive filter in a plan view of the substrate.

2. The module according to claim 1, wherein
an output of the first transmit filter and an input of the first receive filter are commonly coupled to a first common terminal, and
an output of the second transmit filter and an input of the second receive filter are commonly coupled to a second common terminal.

3. The module according to claim 2, further comprising:
a switch that selects and connects one of the first common terminal and the second common terminal to a third common terminal.

4. The module according to claim 1, wherein:
the first receive band does not overlap with the second transmit band or the third transmit band,
the second receive band does not overlaps with the third transmit band,
the first receive band, the second receive band and the third receive band do not overlap with each other, and
the first transmit band, the second transmit band and the third transmit band do not overlap each other.

5. The module according to claim 1, wherein the first receive filter, the second receive filter, and the third receive filter are disposed in one direction.

6. A module comprising:
a substrate;
a first transmit filter that is mounted on the substrate or is embedded in the substrate and that passes a transmission signal of a first band, the first band including a first transmit band and a first receive band, the first transmit band and the first receive band not overlapping with each other;
a first receive filter that is mounted on the substrate or is embedded in the substrate and that passes a reception signal of the first band;
a second transmit filter that is mounted on the substrate or is embedded in the substrate and that passes a transmission signal of a second band, the second band including a second transmit band and a second receive band, the second transmit band and the second receive band not overlapping with each other;
a second receive filter that is mounted on the substrate or is embedded in the substrate and that passes a reception signal of the second band;
a third transmit filter that is mounted on the substrate or is embedded in the substrate and that passes a transmission signal of a third band, the third band including a third transmit band and a third receive band, the third transmit band and the third receive band not overlapping with each other;
a third receive filter that is mounted on the substrate or is embedded in the substrate and that passes a reception signal of the third band;
a fourth transmit filter that is mounted on the substrate or is embedded in the substrate and that passes a transmission signal of a fourth band, the fourth band including a fourth transmit band and a fourth receive band, the fourth transmit band and the fourth receive band not overlapping with each other; and
a fourth receive filter that is mounted on the substrate or is embedded in the substrate and that passes a reception signal of the fourth band, wherein:
the first receive band and the second receive band are simultaneously received,
at least a part of the third receive band overlaps with at least a part of the first transmit band;
the fourth receive band does not overlap with the first transmit band or the second transmit band, and
the fourth receive filter is located between the second receive filter and the third receive filter in a plan view of the substrate.

7. The module according to claim 6, wherein
the first band is LTE band 1, the second band is LTE band 3, and the third band is LTE band 2 or LTE band 25,
the first band is LTE band 2 or LTE band 25, the second band is LTE band 4, and the third band is LTE band 3,
the first band is LTE band 26, the second band is LTE band 12 or LTE band 17, and the third band is LTE band 20, or
the first band is LTE band 8, the second band is LTE band 20, and the third band is LTE band 5 or LTE band 26.

8. The module according to claim 6, wherein:
the first receive band does not overlap with any of the second transmit band, the third transmit band, and the fourth transmit band,
the second receive band does not overlap with any of the first transmit band, the third transmit band, and the fourth transmit band,
the third receive band dose not overlap with the second transmit band or the fourth transmit band,
the fourth receive band does not overlap with the third transmit band,
the first receive band, the second receive band, the third receive band and the fourth receive band do not overlap with each other, and
the first transmit band, the second transmit band, the third transmit and the fourth transmit band do not overlap with each other.

9. The module according to claim 6, wherein the first receive filter, the second receive filter, the third receive filter and the fourth receive filter are disposed in one direction.

10. A module comprising:
a substrate;
at least three first filters that are mounted on the substrate or embedded in the substrate, the at least three first filter being connected between one first common terminal and a corresponding one of at least three first terminals, and having different passbands;

at least one second filter that is mounted on the substrate or embedded in the substrate, the at least one second filter being connected between one second common terminal and a corresponding one of at least one second terminal;

a first wiring line that is included in the substrate and that connects the one first common terminal to the at least three first filters; and a second wiring line that is included in the substrate and connects the one second common terminal to the at least one second filter, wherein:

the first common terminal and the second common terminal are located at a same side as the at least three first filters in a plan view of the substrate, the at least one second filter is opposite the first common terminal and the second common terminal across the at least three first filters in the plan view of the substrate, and the second wiring line intersects with the first wiring line only in a single region in the plan view of the substrate.

11. The module according to claim 10, further comprising a ground pattern that is located between the second wiring line and the first wiring line located in a region where the first wiring line intersects the second wiring line in the plan view of the substrate.

12. The module according to claim 10, wherein the at least three first filters are located at both sides of the first wiring line in the plan view of the substrate.

13. The module according to claim 10, wherein the at least one second filter includes at least three second filters.

14. The module according to claim 10, wherein:

the first filter includes: a first transmit filter for a first transmit band of a first band; a first receive filter for a first receive band of the first band; a second transmit filter for a second transmit band of a second band; and a second receive filter for a second receive band of the second band, the second filter includes: a third transmit filter for a third transmit band of a third band; a third receive filter for a third receive band of the third band; a fourth transmit filter for a fourth transmit band of a fourth band; and a fourth receive filter for a fourth receive band of the fourth band, the first transmit band and the first receive band do not overlap with each other, the second transmit band and the second receive band do not overlap with each other, the third transmit band and the third receive band do not overlap with each other, and the fourth transmit band and the fourth receive band do not overlap with each other.

15. The module according to claim 10, wherein:

the substrate is formed by stacking insulating layers, the at least three first filters and the at least one second filter are mounted on the substrate, and the first wiring line and the second wiring line are formed on surfaces of different insulating layers of the insulating layers in a region where the first wiring line intersects the second wiring line.

* * * * *